United States Patent
Lee et al.

(10) Patent No.: US 12,551,129 B2
(45) Date of Patent: Feb. 17, 2026

(54) SKULL-CONTOURED MRI LOCALIZER

(71) Applicant: Mayo Foundation for Medical Education and Research, Rochester, MN (US)

(72) Inventors: Kendall H. Lee, Rochester, MN (US); Stephen J. Goerss, Rochester, MN (US); Aaron E. Rusheen, Rochester, MN (US); Benjamin T. Gifford, Rochester, MN (US); Andrew J. Fagan, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 456 days.

(21) Appl. No.: 18/011,411

(22) PCT Filed: Jun. 21, 2021

(86) PCT No.: PCT/US2021/038275
§ 371 (c)(1),
(2) Date: Dec. 19, 2022

(87) PCT Pub. No.: WO2021/258057
PCT Pub. Date: Dec. 23, 2021

(65) Prior Publication Data
US 2023/0225629 A1     Jul. 20, 2023

Related U.S. Application Data

(60) Provisional application No. 63/041,789, filed on Jun. 19, 2020.

(51) Int. Cl.
*A61B 5/05* (2021.01)
*A61B 5/055* (2006.01)
(Continued)

(52) U.S. Cl.
CPC .............. *A61B 5/055* (2013.01); *A61B 34/20* (2016.02); *A61B 2090/3954* (2016.02)

(58) Field of Classification Search
CPC ........ A61B 2090/3954; A61B 2505/05; A61B 2576/026; A61B 34/20; A61B 5/0036;
(Continued)

(56) References Cited

U.S. PATENT DOCUMENTS 6,419,680 B1   7/2002   Cosman et al.
7,663,367 B2   2/2010   Wiggins
(Continued)

OTHER PUBLICATIONS

Lee et al., "A Skin-Conformal, Stretchable, and Breathable Fiducial Marker Patch for Surgical Navigation Systems", Micromachines, Feb. 2020 (Year: 2020).*
(Continued)

*Primary Examiner* — Christopher L Cook
(74) *Attorney, Agent, or Firm* — Fish & Richardson P.C.

(57) ABSTRACT

An example apparatus includes a shell portion configured to be worn over a head of a subject. The shell portion defines a plurality of apertures. The apparatus also includes a plurality of spherical fiducial structures disposed on the shell portion. Each of the fiducial structures includes a first material doped with a second material. The second material is a contrast agent for magnetic resource imaging (MRI). The apparatus also includes a mounting structure disposed on the shell portion and configured to secure the shell portion to the head of the subject.

20 Claims, 31 Drawing Sheets

(51) Int. Cl.
  *A61B 34/20* (2016.01)
  *A61B 90/00* (2016.01)
(58) Field of Classification Search
  CPC ..... A61B 5/0042; A61B 5/055; A61B 5/1114;
       A61B 5/1127; A61B 5/4887; A61B
       5/702; A61B 5/706
  See application file for complete search history.

(56) References Cited

U.S. PATENT DOCUMENTS

| | | | | |
|---|---|---|---|---|
| 8,032,204 | B2* | 10/2011 | Solar | A61B 90/39 |
| | | | | 600/407 |
| 8,185,184 | B2 | 5/2012 | Solar et al. | |
| 9,138,164 | B2 | 9/2015 | Driemel | |
| 12,251,329 | B1* | 3/2025 | Nabavian | A61F 5/08 |
| 2007/0073143 | A1* | 3/2007 | Siegel | A61B 90/39 |
| | | | | 600/426 |
| 2016/0113719 | A1 | 4/2016 | Stratton et al. | |
| 2017/0258526 | A1* | 9/2017 | Lang | A61B 17/1742 |
| 2018/0250183 | A1* | 9/2018 | Zwierstra | A61B 5/1127 |
| 2020/0121392 | A1* | 4/2020 | Daniels | A61B 90/37 |

OTHER PUBLICATIONS

Barnett et al., "Frameless stereotaxy with scalp-applied fiducial markers for brain biopsy procedures: experience in 218 cases," J. Nuerosurg., Oct. 1999, 91:569-576.

Ben-Haim et al., "Evaluation of Patient Perspectives Toward Awake, Frame-Based Deep-Brain Stimulation Surgery," World Neurosurg., Mar. 2018, 111:e601-e607.

Brown, "A stereotactic head frame for use with CT body scanners," Invest. Radiol., Jul.-Aug. 1979, 14(4):300-304.

Cabrera et al., "Advances in neurochemical measurements: A review of biomarkers and devices for the development of closed-loop deep brain stimulation systems," Rev. Anal. Chem., 2020, 39(1):188-199.

Cho et al. "Direct visualization of deep brain stimulation targets in Parkinson disease with the use of 7-tesla magnetic resonance imaging." J. Neurosurg., Sep. 2010, 113(3):639-647.

Dietrich et al., "Measurement of signal-to-noise ratios in MR images: influence of multichannel coils, parallel imaging, and reconstruction filters," J. Magn. Reson. Imaging, Aug. 2007, 26(2):375-385.

Duchin et al., "Feasibility of using ultra-high field (7 T) MRI for clinical surgical targeting," PLoS One, May 2012, 7(5):e37328.

Duchin et al., "Patient-specific anatomical model for deep brain stimulation based on 7 Tesla MRI," PLoS One, Aug. 2018, 13(8):e0201469.

Edwards et al., "A novel re-attachable stereotactic frame for MRI-guided neuronavigation and its validation in a large animal and human cadaver model," J. Neural Eng., Sep. 2018, 15:066003, 12 pages.

Fagan et al., "Magnetic Resonance Safety in the 7T Environment," Magn. Reson. Imaging Clin. N. Am., Nov. 2020, 28(4):573-582.

Farahani et al., "Effect of field strength on susceptibility artifacts in magnetic resonance imaging," Comput. Med. Imaging Graph., Nov.-Dec. 1990, 14(6):409-413.

Fitzpatrick et al., "Predicting error in rigid-body point-based registration," IEEE Trans. Med. Imaging, Oct. 1998, 17(5):694-702.

Fitzpatrick, "The role of registration in accurate surgical guidance," Proc. Inst. Mech. Eng., Sep. 2009, 224(5):607-622.

Foo et al., "Lightweight, compact, and high-performance 3T MR system for imaging the brain and extremities," Magn. Reson. Med., Nov. 2018, 80(5):2232-2245.

Forstmann et al., "Ultra High Field MRI-Guided Deep Brain Stimulation," Trends Biotechnol., Oct. 2017, 35(10):904-907.

Goyal et al., "The development of an implantable deep brain stimulation device with simultaneous chronic electrophysiological recording and stimulation in humans," Biosens. Bioelectron., Mar. 2021, 176:112888.

Gross et al., "Electrophysiological mapping for the implantation of deep brain stimulators for Parkinson's disease and tremor," Mov. Disord., Jun. 2006, 21(Suppl. 14):S259-S283.

Hariz et al., "Do microelectrode techniques increase accuracy or decrease risks in pallidotomy and deep brain stimulation? A critical review of the literature," Stereotact. Funct. Neurosurg., 1999, 72(2-4):157-169.

International Preliminary Report on Patentability in International Appln. No. PCT/US2021/038275, mailed on Dec. 29, 2022, 7 pages.

International Search Report and Written Opinion in International Appln. No. PCT/US2021/038275, mailed on Sep. 30, 2021, 9 pages.

Kelly et al., "Magnetic resonance imaging-based computer-assisted stereotactic resection of the hippocampus and amygdala in patients with temporal lobe epilepsy," Mayo Clin. Proc., Feb. 1987, 62(2):103-108.

Kerl et al., "The subthalamic nucleus at 3.0 Tesla: choice of optimal sequence and orientation for deep brain stimulation using a standard installation protocol: clinical article," J. Neurosurg., Dec. 2012, 117(6):1155-1165.

Kneeland et al., "High-resolution MR imaging with local coils," Radiology, Apr. 1989, 171(1):1-7.

Kondziolka et al., "A comparison between magnetic resonance imaging and computed tomography for stereotactic coordinate determination," Neurosurgery, Mar. 1992, 30(3):402-406.

Ladd et al., "Pros and cons of ultra-high-field MRI/MRS for human application," Prog. Nucl. Magn. Reson. Spectrosc., Dec. 2018, 109:1-50.

Lau et al., "Quantification of local geometric distortion in structural magnetic resonance images: Application to ultra-high fields," Neuroimage, Mar. 2018, 168:141-151.

Lenglet et al., "Comprehensive in vivo mapping of the human basal ganglia and thalamic connectome in individuals using 7T MRI," PLoS One, Jan. 2012, 7:e29153.

Mann et al., "Brain penetration effects of microelectrodes and DBS leads in STN or GPi," J. Neurol. Neurosurg. Psychiatry, Jul. 2009, 80(7):794-797.

Maurer et al., "Registration of Head Volume Images Using Implantable Fiducial Markers," IEEE Transactions on Medical Imaging, Aug. 1997, 16(4):447-462.

McRobbie et al., "MRI from picture to proton," 3rd Edition, Cambridge University Press, Apr. 2017, 11 pages (Table of Contents and Chapter 1 only).

Patriat et al., "Individualized tractography-based parcellation of the globus pallidus pars interna using 7T MRI in movement disorder patients prior to DBS surgery," Neuroimage, Sep. 2018, 178:198-209.

Plantinga et al., "Individualized parcellation of the subthalamic nucleus in patients with Parkinson's disease with 7T MRI," Neuroimage, Mar. 2018, 168:403-411.

Price et al., "Clinical applications of neurochemical and electrophysiological measurements for closed-loop neurostimulation," Neurosurg. Focus, Jul. 2020, 49(1):E6.

Rusheen et al., "A compact stereotactic system for image-guided surgical intervention," J. Neural Eng., Dec. 2020, 17(6):1-13.

Rusheen et al., "Abstract #OF058: Development of a Novel Stereotactic System for DBS Neurosurgery using 3T and 7T MRI," Stereotact. Funct. Neurosurg., Jun. 2019, 97(suppl. 1):1-559.

Rusheen et al., "Development of an optimal head localizer for stereotactic neurosurgery at 7.0T with minimal image geometric distortions," Presented at the Proceedings of the ISMRM & SMRT Virtual Conference & Exhibition, Aug. 8-14, 2020, Proc. Intl. Soc. Mag. Reson. Med., 2020, 28:4152.

Rusheen et al., "Evaluation of electrochemical methods for tonic dopamine detection in vivo," Trends Analyt. Chem., Nov. 2020, 132:116049.

Rusheen et al., "Stereotactic Navigation Using 7T MRI for Deep Brain Stimulation Surgery," Presented at the Proceedings of American Physician Scientist Association Annual Meeting, Apr. 5-7, 2019, Chicago, IL, 1 page.

Rusheen et al., "The development of ultra-high field MRI guidance technology for neuronavigation," J. Neurosurg., Mar. 2022, 137(5):1265-1277.

(56) References Cited

OTHER PUBLICATIONS

Rutland et al., "Emerging Use of Ultra-High-Field 7T MRI in the Study of Intracranial Vascularity: State of the Field and Future Directions," AJNR Am. J. Neuroradiol., Jan. 2020, 41(1):2-9.

Starr et al., "Magnetic resonance imaging-based stereotactic localization of the globus pallidus and subthalamic nucleus," Neurosurgery, Feb. 1999, 44(2):303-313.

Stockmann et al., "In vivo B0 field shimming methods for MRI at 7 T," Neuroimage, Mar. 2018, 168:71-87.

Sudhyadhom et al., "A high resolution and high contrast MRI for differentiation of subcortical structures for DBS targeting: the Fast Gray Matter Acquisition T1 Inversion Recovery (FGATIR)," Neuroimage, Aug. 2009, 47(Suppl. 2):T44-T52.

Thani et al., "Accuracy of postoperative computed tomography and magnetic resonance image fusion for assessing deep brain stimulation electrodes," Neurosurgery, Jul. 2011, 69(1):207-214.

Van der Kolk et al., "Clinical applications of 7 T MRI in the brain," Eur. J. Radiol., May 2013, 82(5):708-718.

Voormolen et al., "Implications of Extracranial Distortion in Ultra-High-Field Magnetic Resonance Imaging for Image-Guided Cranial Neurosurgery," World Neurosurg., Jun. 2019, 126:e250-e258.

Vranic et al., "Compressed Sensing-Sensitivity Encoding (CS-SENSE) Accelerated Brain Imaging: Reduced Scan Time without Reduced Image Quality," AJNR Am. J. Neuroradiol., Jan. 2019, 40(1):92-98.

Wang et al., "Geometric distortion in clinical MRI systems Part I: evaluation using a 3D phantom," Magn. Reson. Imaging, Nov. 2004, 22(9):1211-1221.

West et al., "Fiducial point placement and the accuracy of point-based, rigid body registration," Neurosurgery, Apr. 2001, 8(4):810-816.

Wiles et al., "A statistical model for point-based target registration error with anisotropic fiducial localizer error," IEEE Trans. Med. Imaging, Mar. 2008, 27(3):378-390.

\* cited by examiner

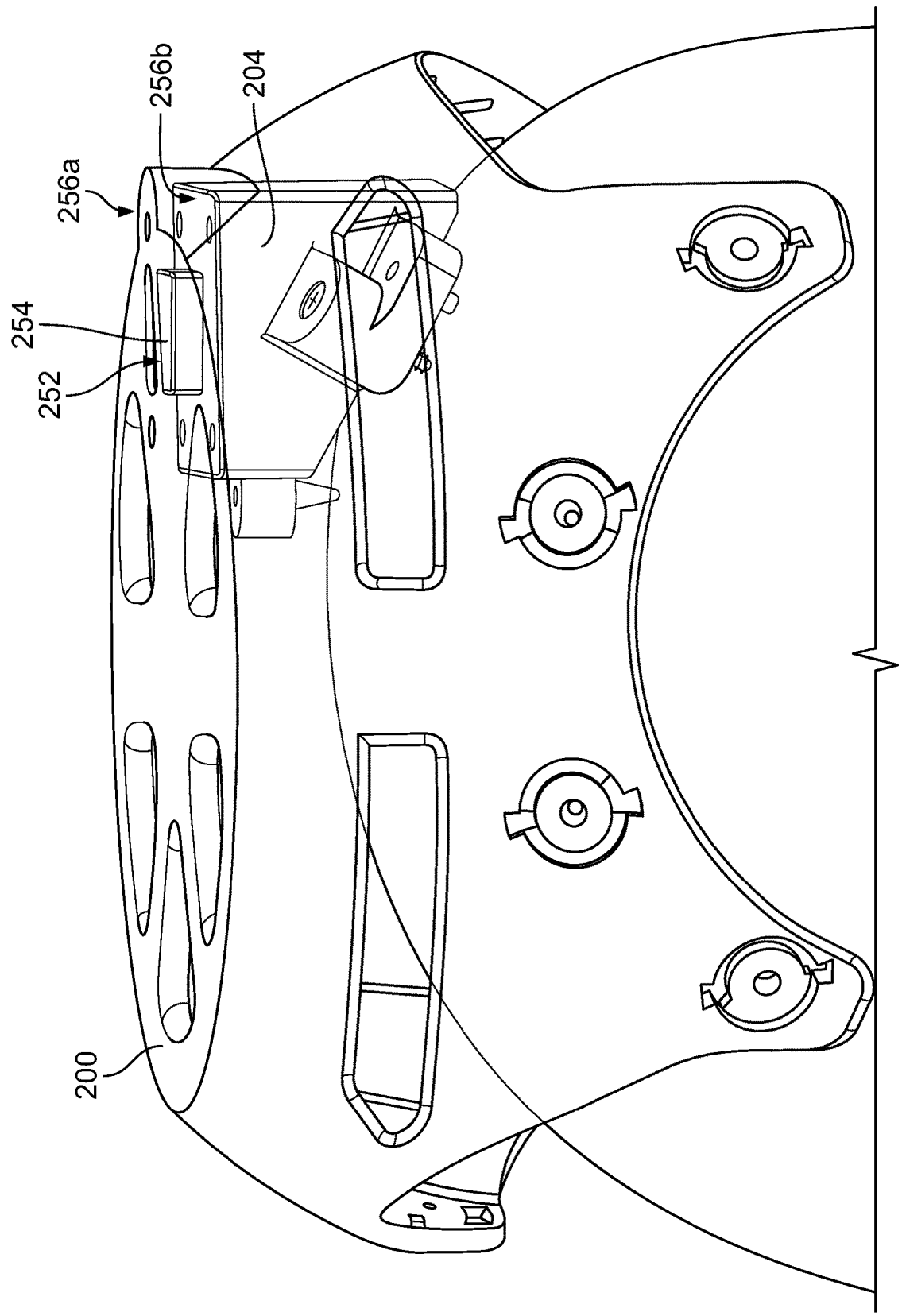

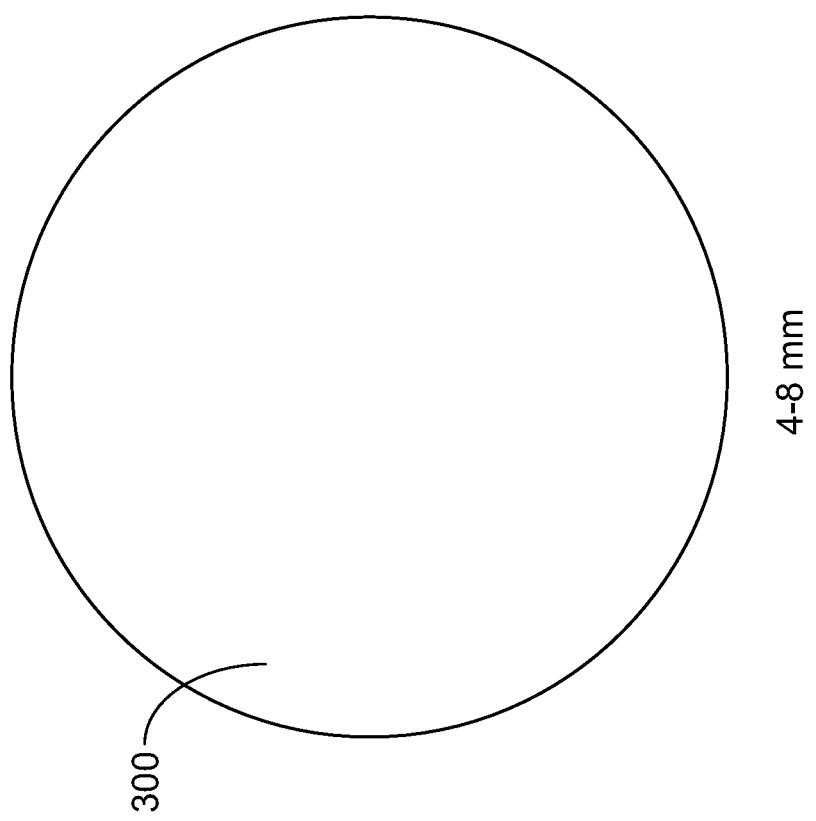

SKULL-CONTOURED MRI LOCALIZER

CROSS-REFERENCE TO RELATED APPLICATIONS

This application is a National Stage application under 35 U.S.C. § 371 of International Application No. PCT/US2021/038275, having an International Filing Date of Jun. 21, 2021, which claims the benefit of U.S. Provisional Application Ser. No. 63/041,789, filed Jun. 19, 2020. The disclosure of the prior application is considered part of (and is incorporated by reference in) the disclosure of this application.

TECHNICAL FIELD

This disclosure relates to magnetic resonance imaging.

BACKGROUND

Magnetic resonance imaging (MRI) is a medical imaging technique used to form images of the anatomy and the physiological processes of a subject based on the subject's response to magnetic fields. As an example, a magnetic resonance (MR) scanner can generate magnetic fields, magnetic field gradients, and radio waves within a bore of the MR scanner, measure the properties of a subject within the bore, and generate one or more images based on the measurements.

SUMMARY

In an aspect, an apparatus includes a shell portion adapted to be worn over a head of a subject, the shell portion defining a plurality of apertures; a plurality of spherical fiducial structures disposed on the shell portion, where each of the fiducial structures includes a first material doped with a second material, wherein the second material is a contrast agent for magnetic resonance imaging (MRI); and a mounting structure disposed on the shell portion and configured to secure the shell portion to the head of the subject.

Implementations of this aspect can include one or more of the following features.

In some implementations, the first material can be silicon (e.g., silicone).

In some implementations, the second material can be copper sulfate.

In some implementations, the shell portion can include plastic.

In some implementations, the plastic can be polylactic acid (PLA) plastic.

In some implementations, the shell portion includes a glass-filled polymer.

In some implementations, at least some of the apertures can be wedge shaped.

In some implementations, at least some of the apertures can be aligned along a circumference of the shell portion.

In some implementations, the shell portions can include a plurality of sockets, where each of the sockets is configured to receive a respective one of the fiducial structures.

In some implementations, the sockets can be distributed on the shell portion according to a rotationally asymmetric pattern.

In some implementations, the shell portion can include a plurality of protuberances extending from a bottom edge of the shell portion and away from an upper surface of the shell portion.

In some implementations, at least one of the sockets can be disposed on at least one of the protuberances.

In some implementations, at least one of the sockets can be disposed on between two adjacent protuberances.

In some implementations, the apparatus can include a plurality of caps, where each of the caps is configured to insert into a respective one of the sockets.

In some implementations, each of the sockets can include one or more respective slots configured to receive a respective one of the caps.

In some implementations, the apparatus can be configured to be worn by over the head of the subject while the head of the subject is in a bore of a 7T MRI system.

In another aspect, a system includes a magnetic resonance imaging (MRI) system including one or more computer systems, and the apparatus described above. The MRI system is configured to generate, while the apparatus is being worn by the subject, one or more images of the subject and the apparatus; determine, based on the one or more images, a respective position of each of the fiducial structures relative to the subject, and determine, based on the determined positions of each of the of fiducial structures, a three-dimensional coordinate system fixed to the subject.

Implementations of this aspect can include one or more of the following features.

In some implementations, the MRI system can be further configured to identify, based on the one or more images, one or more anatomical features of the subject, and determine, for each of the one or more anatomical features, a location of the anatomical feature according to the three-dimensional coordinate system.

Implementations of this aspect can include one or more of the following features.

In some implementations, the system can further include a stereotactic device having one or more surgical instruments, wherein the stereotactic device is configured to be secured to the head of a subject.

In some implementations, the one or more surgical instructions can include at least one of a probe, a cannula, or an electrode.

In some implementations, determining the respective position of each of the fiducial structures relative to the subject can include receiving, by the MRI system, user input identifying at least some of the fiducial structures in the one or more images.

In some implementations, determining the respective position of each of the fiducial structures relative to the subject can include automatically identifying, by the MRI system, at least some of the fiducial structures in the one or more images.

The details of one or more embodiments are set forth in the accompanying drawings and the description below. Other features and advantages will be apparent from the description and drawings, and from the claims.

DESCRIPTION OF DRAWINGS

FIGS. 2F-2H are diagrams of an example coupling between a localizer apparatus and a key device.

FIG. 3A is a diagram of an example fiducial.

Like reference symbols in the various drawings indicate like elements.

DETAILED DESCRIPTION

Figure 1:
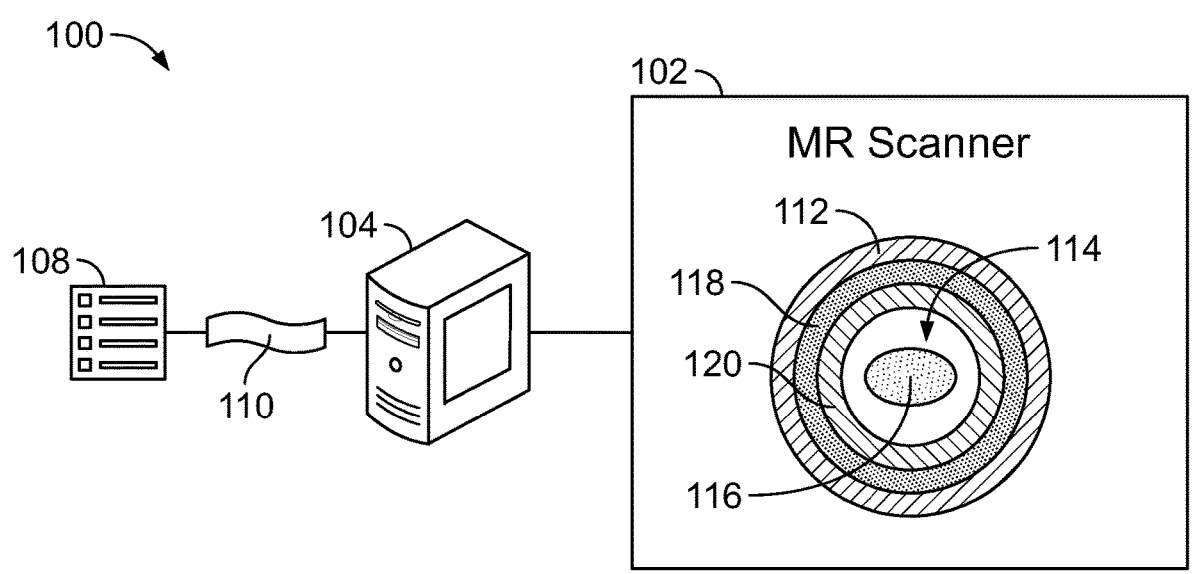
FIG. 1 is a diagram of system for obtaining MR images of a subject.

An example system 100 for obtaining MR images of a subject is shown in FIG. 1. The system 100 includes a MR scanner 102, and a computer system 104 for controlling the operation of the MRI scanner 102.

The MR scanner 102 is a system for generating images of the anatomy and the physiological processes of a subject based on the subject's response to magnetic fields. In general, in MRI, hydrogen nuclei (i.e., protons) that are in the tissues of a subject create a signal that is processed to form an image of the subject in terms of the density of those nuclei in a specific region. As the protons are affected by fields from other atoms to which they are bonded, it is possible to separate responses from hydrogen in specific compounds.

To perform an imaging protocol, a subject is positioned within the MR scanner 102, which forms a strong magnetic field around the area to be imaged (e.g., 1.5T, 3T, 7T, etc.). For example, the MR scanner 102 can include a superconducting magnet 112 that is configured to induce a magnetic field through a bore 114 of the magnet 112, within which a subject 116 is positioned. Further, energy from an oscillating magnetic field is temporarily applied to the subject at the appropriate resonance frequency (e.g., the resonance frequency of the hydrogen nuclei of the subject, in response of the magnetic field). Scanning with gradient coils 118 causes a selected region of the subject to experience the exact magnetic field required for the energy to be absorbed. The excited atoms emit a radio frequency (RF) signal, which is measured by a receiving coil 120. The RF signal may be processed (e.g., by the computer system 104a) to deduce position information by identifying the changes in RF level and phase caused by varying the local magnetic field using the gradient coils 118. The contrast between different tissues is determined by the rate at which excited atoms return to the equilibrium state.

The computer system 104 is communicatively coupled to the MR scanner 102, and is configured to control the operation of the MR scanner 102 and/or to process data generated by the MR scanner 102. For example, the computer system 104 can instruct the MR scanner 102 to generate magnetic fields and measure RF signals emitted by the subject according to a particular MRI protocol (e.g., a sequence of commands for generating specific types of images of the subject). As another example, the computer system 104 can receive data regarding the measured RF signals, and generate one or more images based on the data.

The computer systems 104 can include one or more electronic devices that are configured to present, process, transmit, and/or receive data. Examples of the computer system 104 include computers (such as desktop computers, notebook computers, server systems, etc.), mobile computing devices (such as cellular phones, smartphones, tablets, personal data assistants, notebook computers), and other devices capable of presenting, processing, transmitting, and/or receiving data. The computer system 104 can include devices that operate using one or more operating system (e.g., Microsoft Windows, Apple macOS, Linux, Unix, Google Android, Apple iOS, etc.) and/or architectures (e.g., x86, PowerPC, ARM, etc.) In some implementations, the computer system 104 need not be located locally with respect to the rest of the system 100, and the computer system 104 and can be located in one or more remote physical locations.

In FIG. 1, the computer system 104 is illustrated as a single component. However, in practice, the computer system 104 can be implemented on one or more computing devices in one or more locations (e.g., each computing device including at least one processor such as a microprocessor or microcontroller).

The computer system 104 includes a user interface 108. Users interact with the user interface 108 to view data (e.g., data on the computer system 104 and/or the MR scanner 102). Users also interact with the user interface 108 to issue commands 110. The commands 110 can be, for example, any user instruction to the computer system 104 and/or the MR scanner 102. In some implementations, a user can install a software application on the computer system 104 to facilitate performance of these tasks.

In some implementations, the system 100 can facilitate the performance of a stereotactic neurosurgery procedure on a subject. Stereotactic neurosurgery is a minimally invasive form of surgical intervention which makes use of a three-dimensional coordinate system to locate targets inside the body (e.g., targets within the brain) and to perform on them some action such as ablation, biopsy, lesion, injection, stimulation, implantation, radiosurgery (SRS), etc.

For example, the system 100 can be used to obtain one or more images of a subject, and based on the one or more images, identify the location of one or more targets within the subject (e.g., tumors, lesions, tissue, organs, and/or other anatomical features) according to a three-dimensional coordinate system. In some implementations, the coordinate system can be fixed relative to the subject. The location information (e.g., coordinates or ranges of coordinates corresponding to the one or more targets) can be used to position and operate a stereotactic device having one or more surgical instruments (e.g., one or more probes, cannulas, electrodes, etc.), such that the one or more surgical instruments can be guided to the one or more targets accurately and precisely. For instance, the stereotactic device can be physically registered to the three-dimension coordinate system, such that the stereotactic device is at a known location and has a known orientation with respect to the subject. Further, the one or more surgical instruments can be manipulated in accordance with the three-dimensional coordinate system (e.g., by a human operator and/or by a computerized robotic system).

To facilitate the performance of a stereotactic neurosurgery procedure, a localizer apparatus can be secured to the subject (e.g., along or around the subject's head), and imaged alongside the subject using the system 100. The localizer apparatus includes several landmarks (e.g., physically and/or visually distinctive structures) that enable the system 100 to determine the location of features of the subject more accurately and precisely. For example, the localizer apparatus can be secured to the subject, such that the landmarks are positioned at known locations relative to the subject (e.g., at known locations with respect to the coordinate system), and a radio frequency (RF) coil of the MRI system can be placed over the localizer apparatus. The system 100 can receive signals from the localizer apparatus and the subject using the RF coil, identify the locations of these landmarks in the images, and based on this information, derive the locations of other features of the subject with respect to the coordinate system.

Example localizer apparatuses and techniques for using the localizer apparatuses are described herein. In some implementations, the localizer apparatuses described herein may be particular suitable for use with a 7T MR scanner, which may have a relatively narrow bore (e.g., compared to 1.5T and 3T MR scanners). For example, the localizer apparatuses described herein may be sufficiently compact in size and shape, such that they can be readily positioned within the bore of a 7T MR scanner alongside the subject and an RF coil.

In some implementations, a localizer apparatus can be secured to a subject by first securing a mounting device (referred to as a "key") to the bone of the subject (e.g., along the top of the subject's skull). In turn, the localizer apparatus can be secured to the key, such that the localizer apparatus is fixed relative to the subject. The key can have a particular shape and particular dimensions that facilitate the positioning of the localizer apparatus within the confines of a MR scanner. For example, in some implementations, the "key" can be approximately 4.4 cm wide×4.4 cm length×14.3 mm thick at the front, and 37.8 mm thick at the back (e.g., a 30 degree slope).

In some implementations, the localizer apparatus can be contoured to a subject's head (e.g., in a manner similar to a helmet). Further, the localizer apparatus can have multiple physical landmarks (also referred to as "fiducials" or "point fiducials") positioned at known locations along the localizer apparatus. When imaged, the fiducials appear in the images as visible points or spots alongside the subject. As the fiducials are positioned at known locations on the localizer apparatus (which in turn is fixed to the subject), the points in the images can be used to derived the location of features of the subject relative to a three-dimensional coordinate system that is fixed relative to the subject. In some implementations, the localizer apparatus can include 8 to 10 fiducials. In some implementations, the localizer apparatus can include some other number of fiducials (e.g., less than 8, or greater than 10).

Each of the fiducials can have a particular size and shape. As an example, in some implementations, at least some of the fiducials can be spherical or approximately spherical (e.g., deviating from a sphere by 5%, 10%, or some other tolerance). As another example, in some implementations, at least some of the fiducials can have an annular or ring shape. In some implementations, at least some of the fiducials can have a diameter of 4 mm or approximately 4 mm (e.g., ±5%, ±10%, or some other tolerance). In some implementations, at least some of the fiducials can have a diameter between 4 mm and 8 mm or approximately between 4 mm and 8 mm (e.g., ±5%, ±10%, or some other deviation). In some implementations, at least some of the fiducials can have some other diameter.

Further, each of the fiducials can be composed of one or more particular materials. As an example, in some implementations, at least some of the fiducials can be composed, at least in part, of a silicon (e.g., TC-5005 Silicone, BJB Enterprises, Tustin, California) doped with an MRI contrast material (e.g., a T2* shortening contrast agent, such as copper sulfate). This can be beneficial, for example, as it provides the fiducials with particular MR relaxometry properties that produce significant visibility in T1-weighted, T2-weighted and T2*-weighted imaging protocols. Further, the inclusion of copper sulfate can reduce the image signature of the fiducials (which in some implementations, may be too high with pure silicone).

The localizer apparatuses described herein can facilitate the performance of various surgical procedures. As an example, a localizer apparatus can be used to investigate deep brain stimulation (DBS) lead placement accuracy and clinical outcomes. As further examples, a localizer apparatus can be used to guide other stereotactic neurosurgery procedures.

Although the localizer apparatuses are described herein primarily with respect to 7T MM systems, in practice, at least some of the localizer apparatuses can be used with respect to MRI systems operating according to different field strengths (e.g., either higher or lower than 7T). For example, for lower field strengths, one or more of the localizer apparatus described herein may permit the use of smaller radio frequency (RF) head coils, potentially improving quality of images produced by these systems. Further, one or more of the localizer apparatuses can be used for computed tomography (CT) imaging and registration.

Additional details regarding example localizer apparatuses and techniques for using the localizer apparatuses are described below.

An example localizer apparatus 200 is shown in FIGS. 2A-2E (according to a front view, left view, right view, rear view, and top view, respectively). In this example, the localizer apparatus 200 is secured to the head of a subject 202 via a key device 204 (shown in FIG. 2E). For example, the localizer apparatus 200 can include a mounting structure 252 (e.g., a socket) configured to mechanically couple to at least a portion of the key device 204 (e.g., a corresponding protuberance). Further, the localizer apparatus 200 is sized and shaped such that a RF coil of an MM system can be placed over it, such that the MRI system can receive RF signals from the localizer apparatus 200 and the subject concurrently, and generate one or more of images of the localizer apparatus 200 and the subject.

The localizer apparatus 200 includes a shell portion 250 configured to be placed over the head of the subject 202. For example, the shell portion 250 can have a shape similar to that of a helmet (e.g., a bowl shape having an aperture on one end to receive the head of the subject 202). In some implementations, the shell portion 250 of the localizer apparatus 200 can be composed, at least in part, of plastic. For example, the shell portion 250 of the localizer apparatus 200 can be composed, at least in part, of polylactic acid (PLA) plastic, and/or one or more additional plastics. As another example, the shell portion 250 of the localizer apparatus 200 can be composed, at least in part, of glass-filled polymers (e.g., glass-filled nylon).

As shown in FIGS. 2A-2E, the localizer apparatus 200 defines several apertures 206, through which the head of the subject 202 can be accessed (e.g., by one or more surgical instruments) and/or to provide ventilation (e.g., to improve the comfort of the subject). In some implementations, at least some of the apertures 206 (e.g., the apertures on the sides of the localizer apparatus 200) can be aligned along a circumference of the localizer apparatus 200 (e.g., such that they at least partially encircle the head of the subject). Further, those apertures 206 can shaped such that their primary dimension of elongation aligns with the circumstance of the localizer apparatus.

In some implementations, at least some of the apertures 206 (e.g., the apertures on the top of the localizer apparatus) can be wedge shaped (e.g., triangular or approximately triangular shaped, and having one or more support structures 208 disposed between them).

Figure 3B:
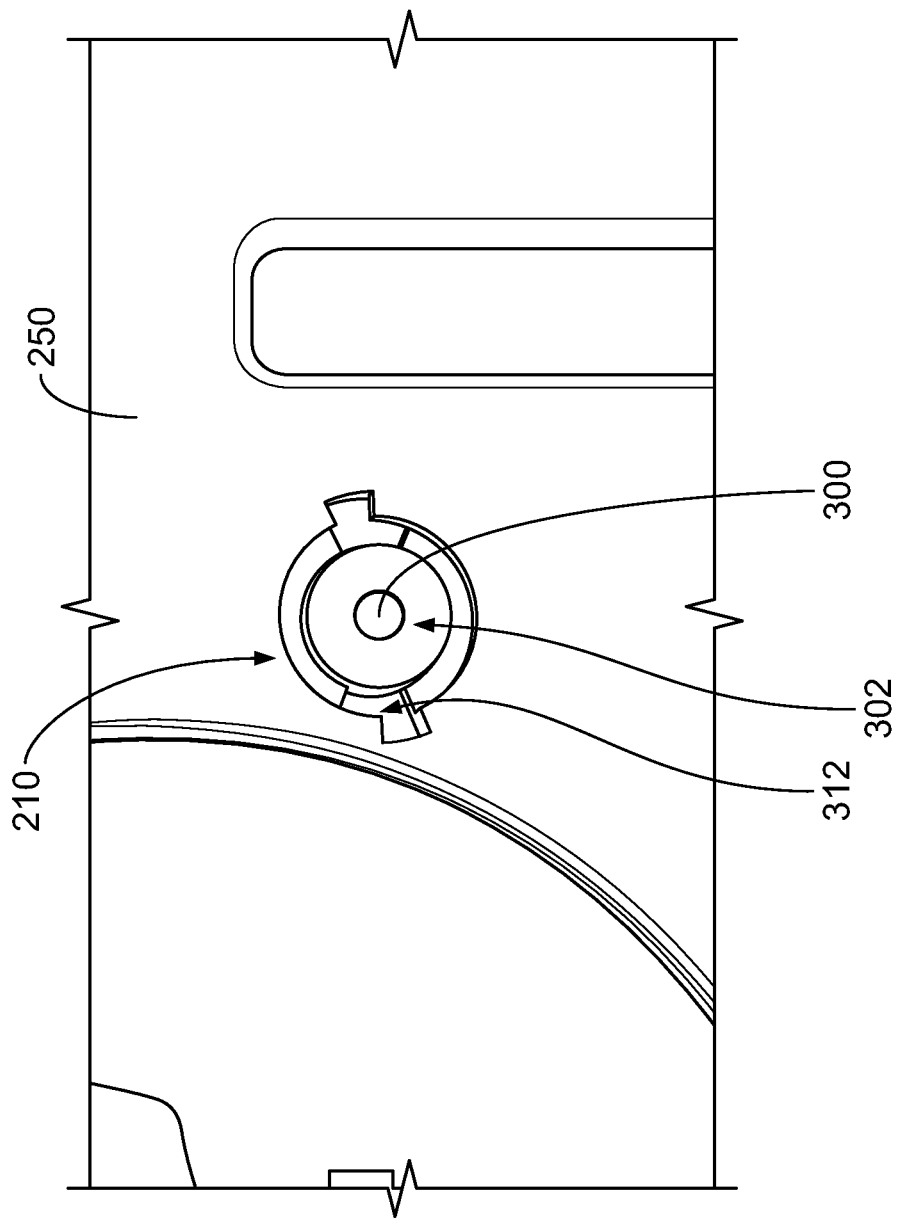
FIG. 3B is a diagram of an example socket for receiving a fiducial.
Figure 3C:
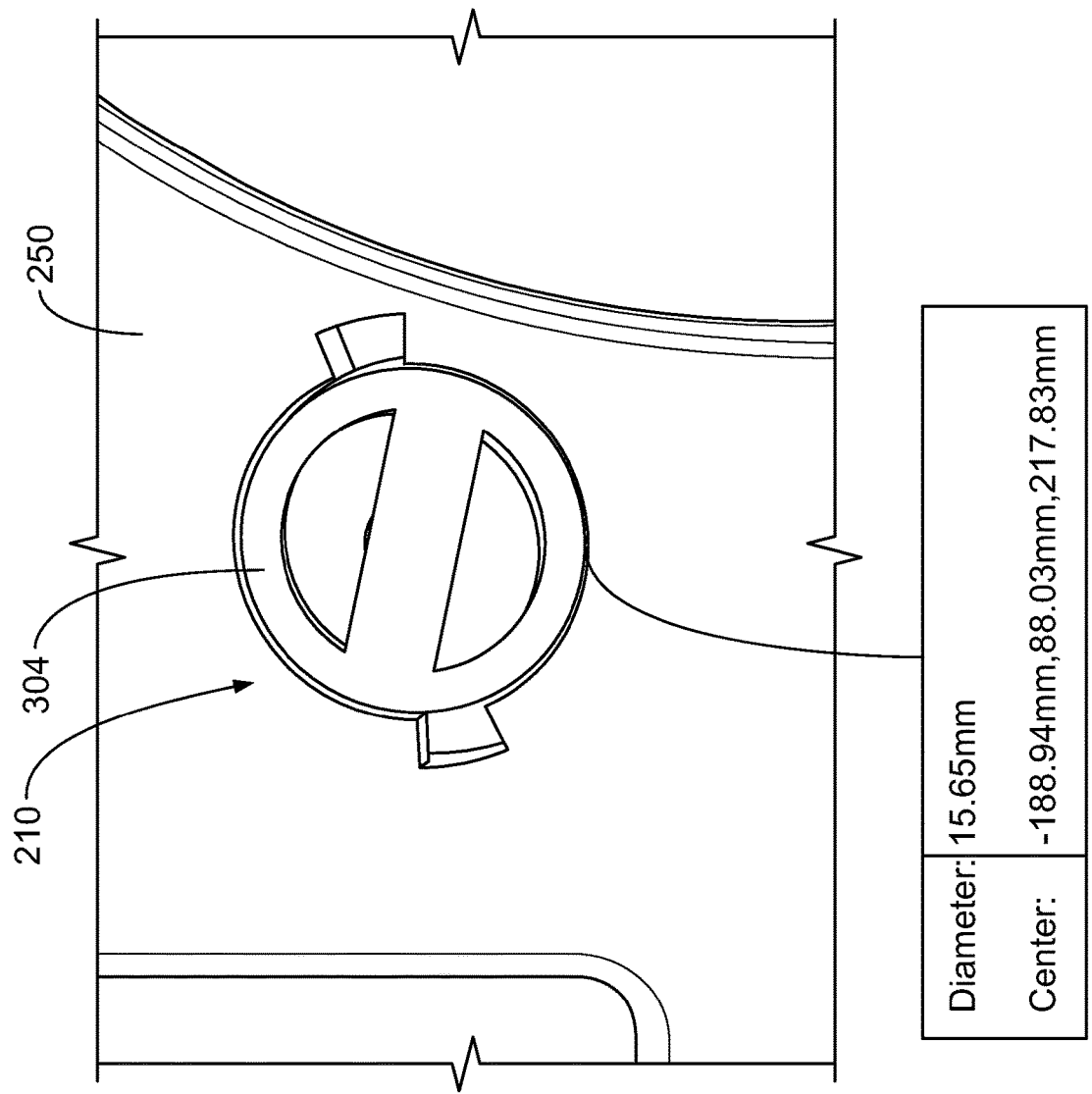
FIG. 3C is a diagram of an example cap inserted into a socket.

Further, as shown in FIGS. 2A-2E, the localizer apparatus 200 include several sockets 210, each configured to receive a respective fiducial 300. In some implementations, a fiducial 300 can be spherical or approximately spherical in shape, and can be inserted into a circular or approximately circular aperture 302 of the socket 210 (e.g., as shown in FIG. 3B). Further, a cap 304 can be inserted into the socket 210 over the fiducial 300 to secure the fiducial 300 in place (e.g., as shown in FIG. 3C).

Figure 3D:
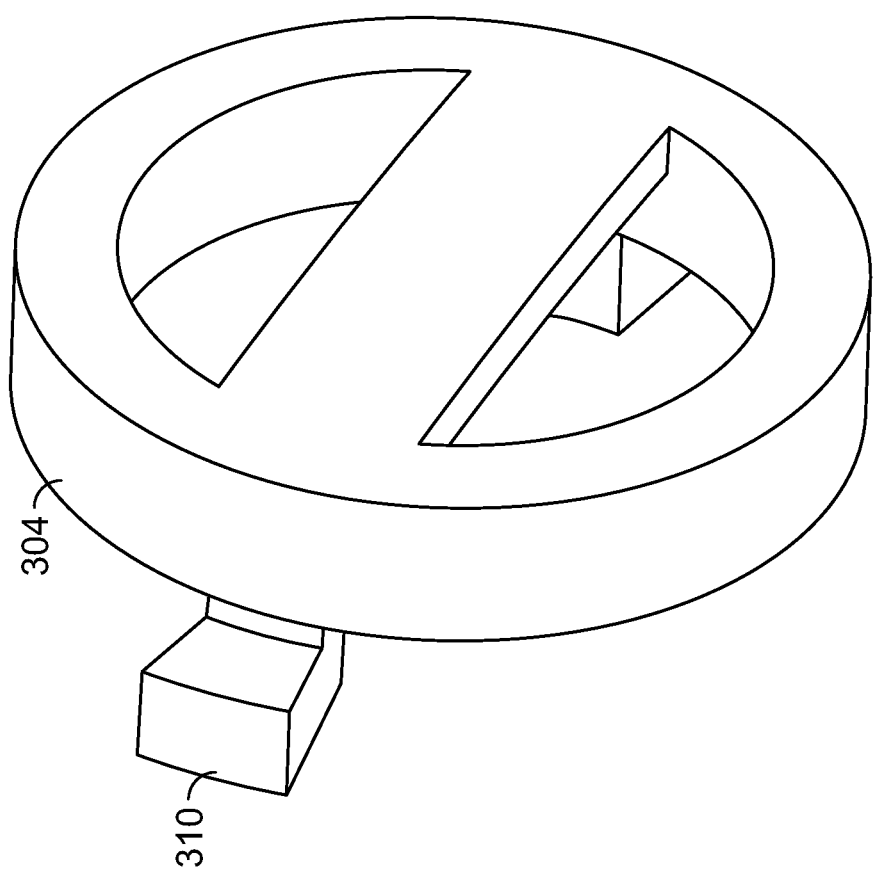
FIGS. 3D and 3E are diagrams of an example cap.
Figure 3E:
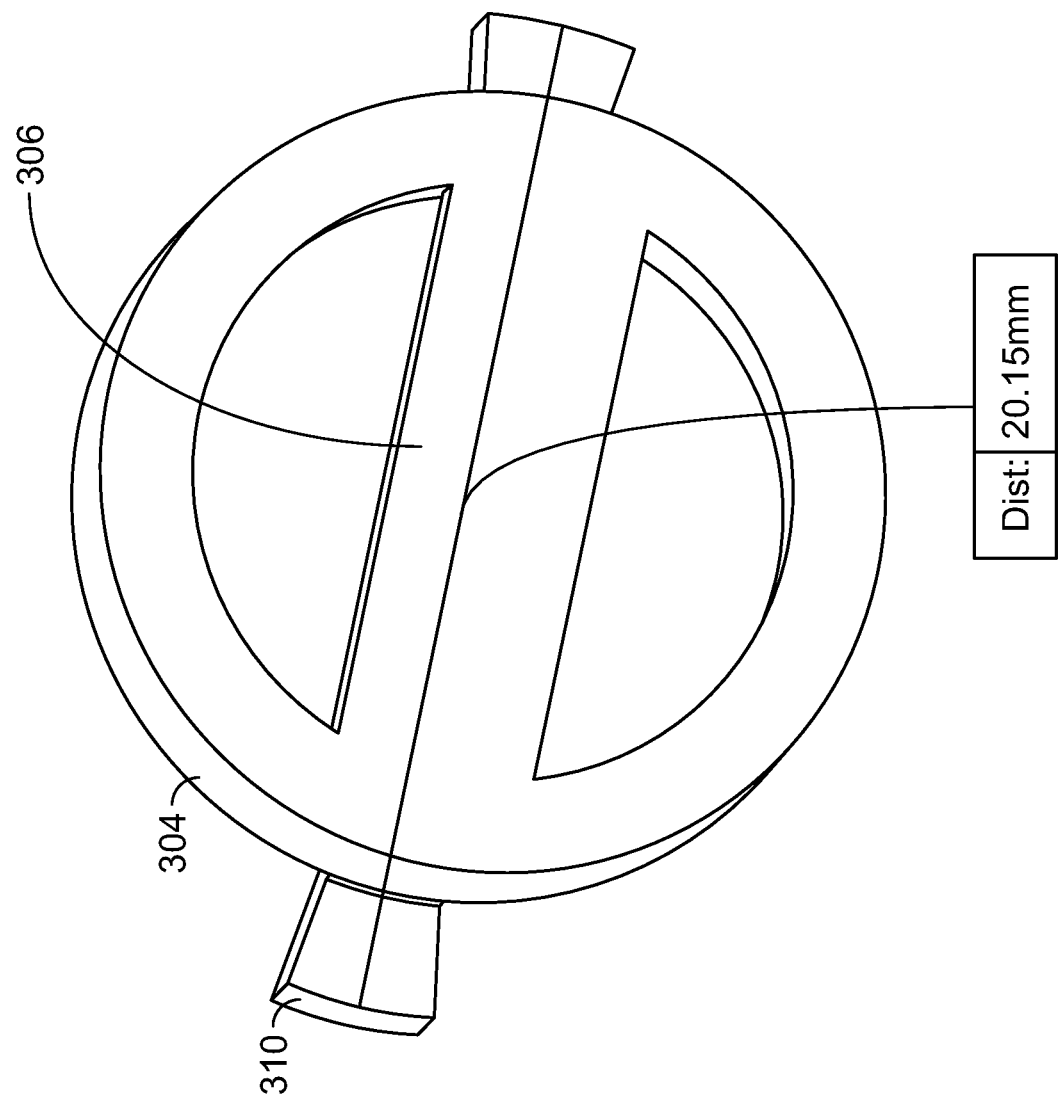
Figure 4B:
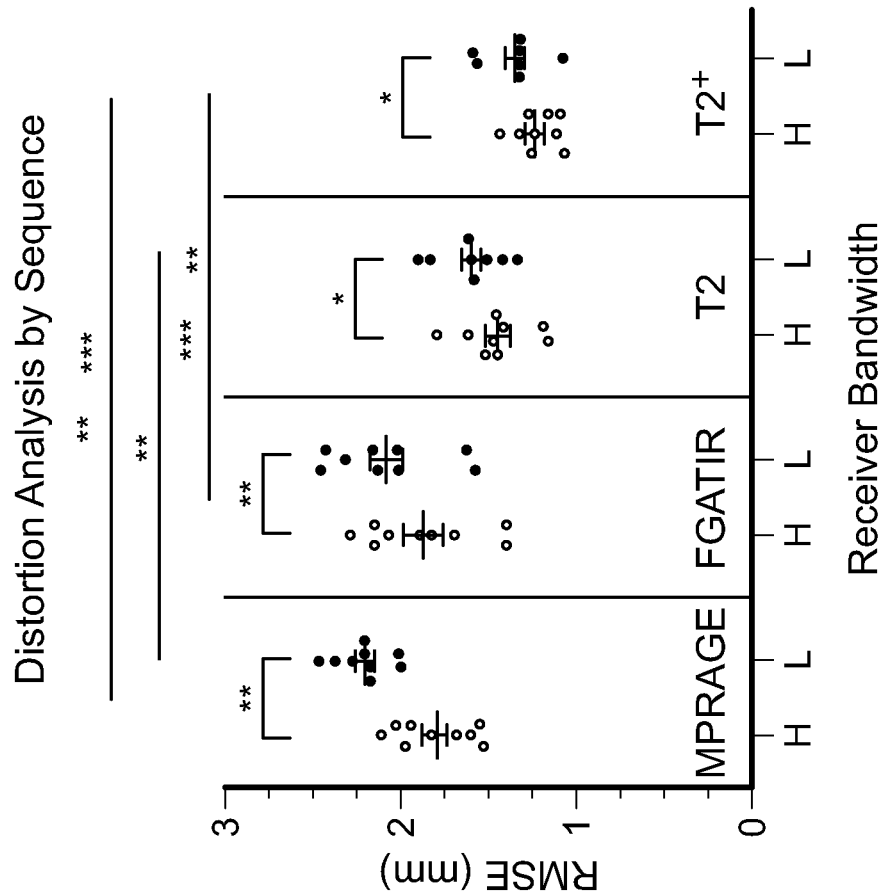
FIG. 4 is a diagram showing an evaluation of extracranial distortion at 7T. Panel A: individual distortions at spatial distinct regions, from the apex of the head to the base of the head were analyzed among 4 different imaging sequences at high and low bandwidths (BW). Missing values in the T2-w High BW sequence reflect inability to visualize the fiducials. Panel B: The root mean square error the pooled distortions was compared amongst sequences at low (L) and high bandwidths (H) in 9 human subjects. Box and whisker plot depicting mean, interquartile range, and total range. For inter-sequence comparisons, * designates significance for low bandwidth comparisons, and #for high bandwidth comparisons. Panel C: Extracranial distortion was analyzed via a custom distortion analysis device that fit around the subject's head within the head coil. * $p<0.05$, , ##$p<0.01$, *, ###$p<0.001$, **** $p<0.0001$.
Figure 4A:
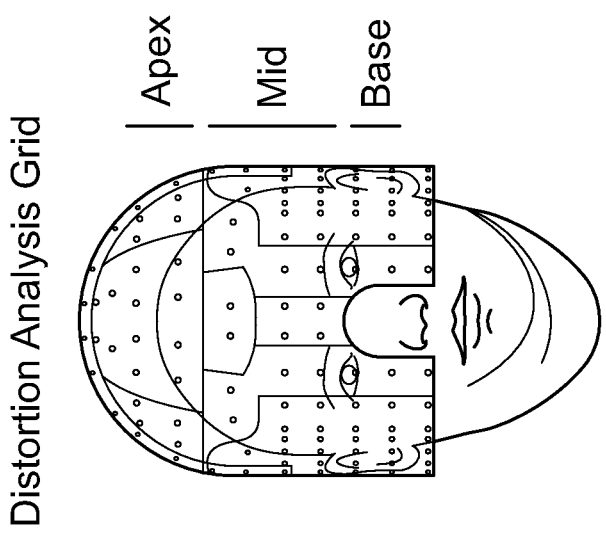
Figure 4C:
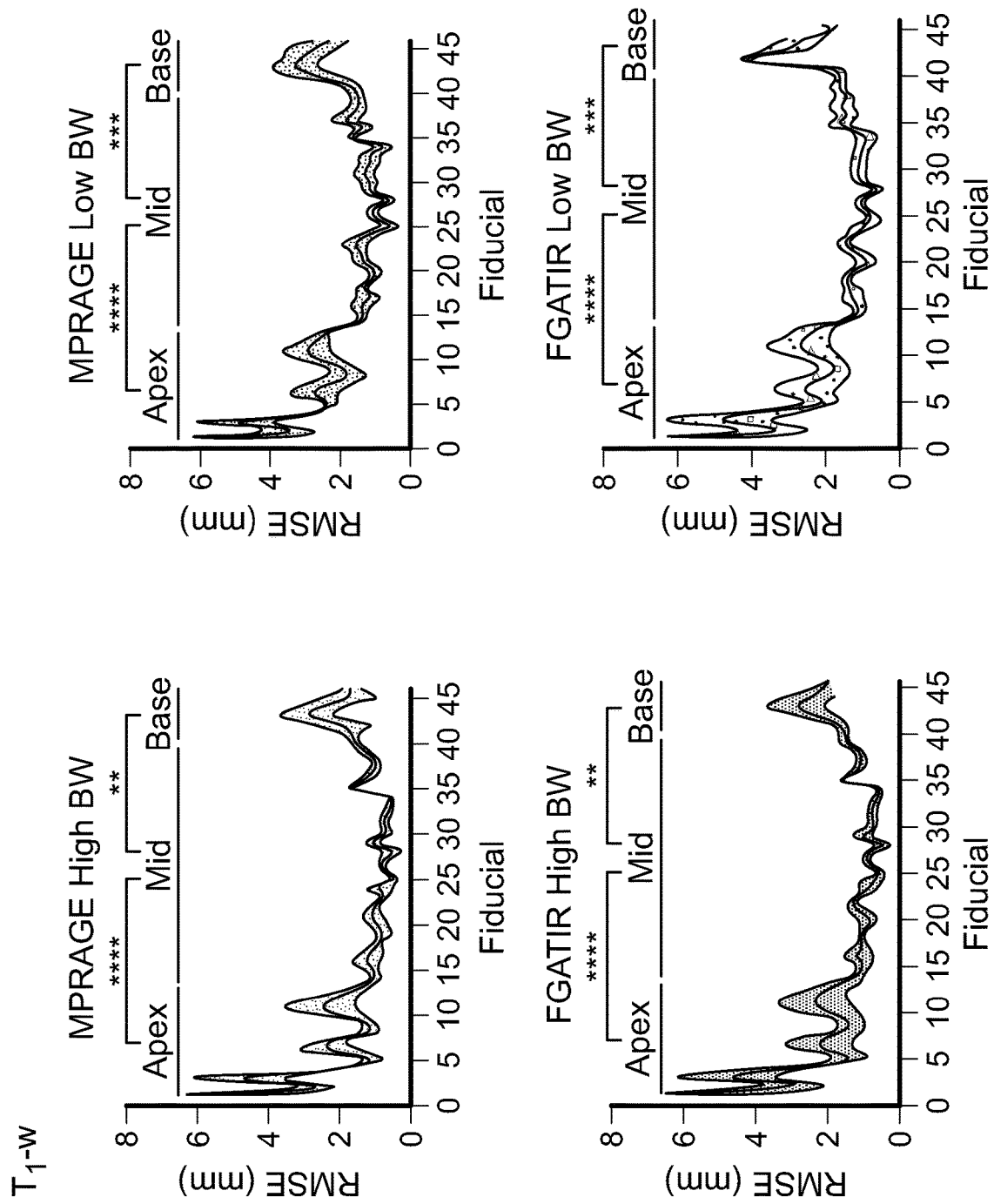
Figure 4C:
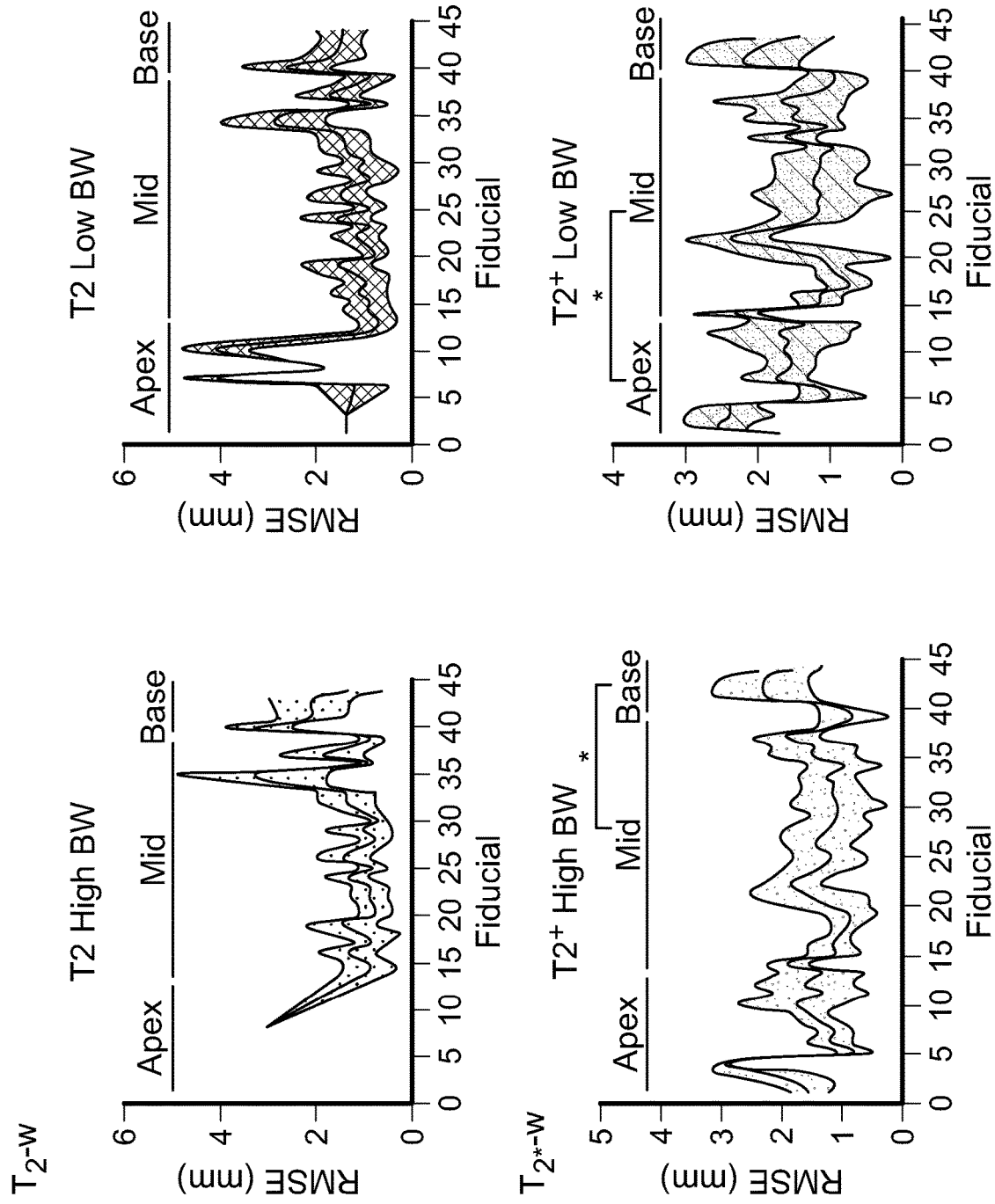

FIGS. 3D and 3E show additional views of the cap 304. As shown in FIGS. 3D and 3E, the cap 304 can include an annular portion 306, a support structure 308 extending between opposite sides of the annular portion 306 (e.g., along a diameter of the annular portion 306), and flared protrusions 310 extending orthogonally from the annular portion. The flared protrusions 310 can be inserted into corresponding slots 312 of the socket 210, and once inserted, the cap 304 can be rotated within the slot 312 to secure the cap 304 to the localizer apparatus 200.

As described above, at least some of the fiducials 300 can be spherical or approximately spherical (e.g., deviating from a sphere by 5%, 10%, or some other tolerance). This can be beneficial, for example, as the fiducials will appear as circular points or dots in an Mill image, regardless of the imaging plane. In some implementations, at least some of the fiducials 300 can have an annular or ring shape.

In some implementations, at least some of the fiducials 300 can be composed, at least in part, of a silicon (e.g., TC-5005 Silicone, BJB Enterprises, Tustin, Calif.) doped with an MM contrast material (e.g., copper sulfate).

In the example shown in FIGS. 2A-2E, the localizer apparatus 200 includes nine sockets 210 positioned along the periphery of the localizer apparatus 200. At least some of the sockets 210 can be positioned on protrusions 212 extending from a bottom of the localizer apparatus 200. This can be beneficial, for example, as it enables a fiducial 300 to be positioned at a particular location the head of the subject 202, without obscuring large portions of the head of the subject 202 surrounding the fiducial 300. In some implemented, the protrusions 212 can be rounded (e.g., to improve patient comfort).

Further, at least some of the sockets 210 can be positioned between the protrusions 212. For example, the localizer apparatus 200 can include edges 214 (e.g., arced edges) extending between the adjacent protrusion 212. One or more of the sockets 210 can be placed along those edges 214 (e.g., such that they are positioned higher than the sockets that are positioned on the corresponding protrusions 212).

Further some implementations, the sockets 210 can be positioned asymmetrically upon the localizer apparatus 200 (e.g., rotationally asymmetric and/or asymmetric with respect to one or more axes). This can be beneficial, for example, in improving the accuracy and precision of the registration process (e.g., by providing non-redundant registration points).

The example positions of the sockets 210 shown in FIGS. 2A-2E may be particularly advantageous in at least some implementations. For example, these positions may coincide with imaging regions of the MRI system that have relatively lower degrees of distortion, such as spatial distortion (e.g., compared to other imaging regions). Accordingly, the position of the fiducials can be determined more accurately and precisely, thereby improving the accuracy and precision of the registration process. Nevertheless, in practice, the sockets 210 can be positioned differently, depending on the implementation. Further, in some implementations, the localizer apparatus 200 can include a greater number of sockets 210 (e.g., greater than 10), or fewer sockets 210 (e.g., less than 8).

Further, example dimensions of the localizer apparatus 200, the fiducials 300, and the caps 304 are shown in FIGS. 2A-2E and 3A-3E. In some implementations, components having these dimensions may be particularly suitable for use with 7T MRI systems (e.g., such that the components can readily fit within the bore of the 7T MRI system alongside the subject). Nevertheless, in practice, other dimensions are possible, depending on the implementation.

Figure 2A:
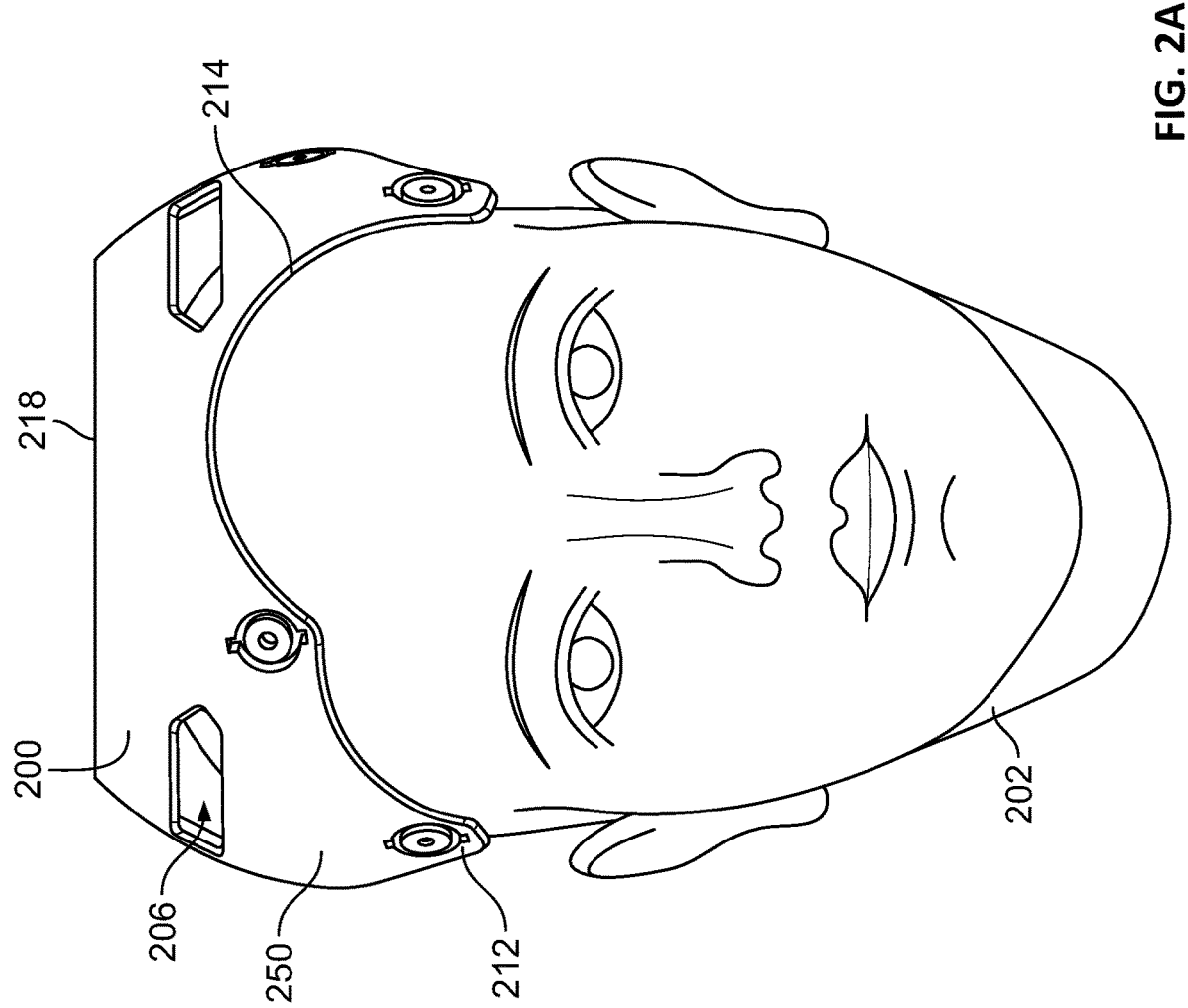
FIGS. 2A-2E are diagrams of an example localizer apparatus.
Figure 2B:
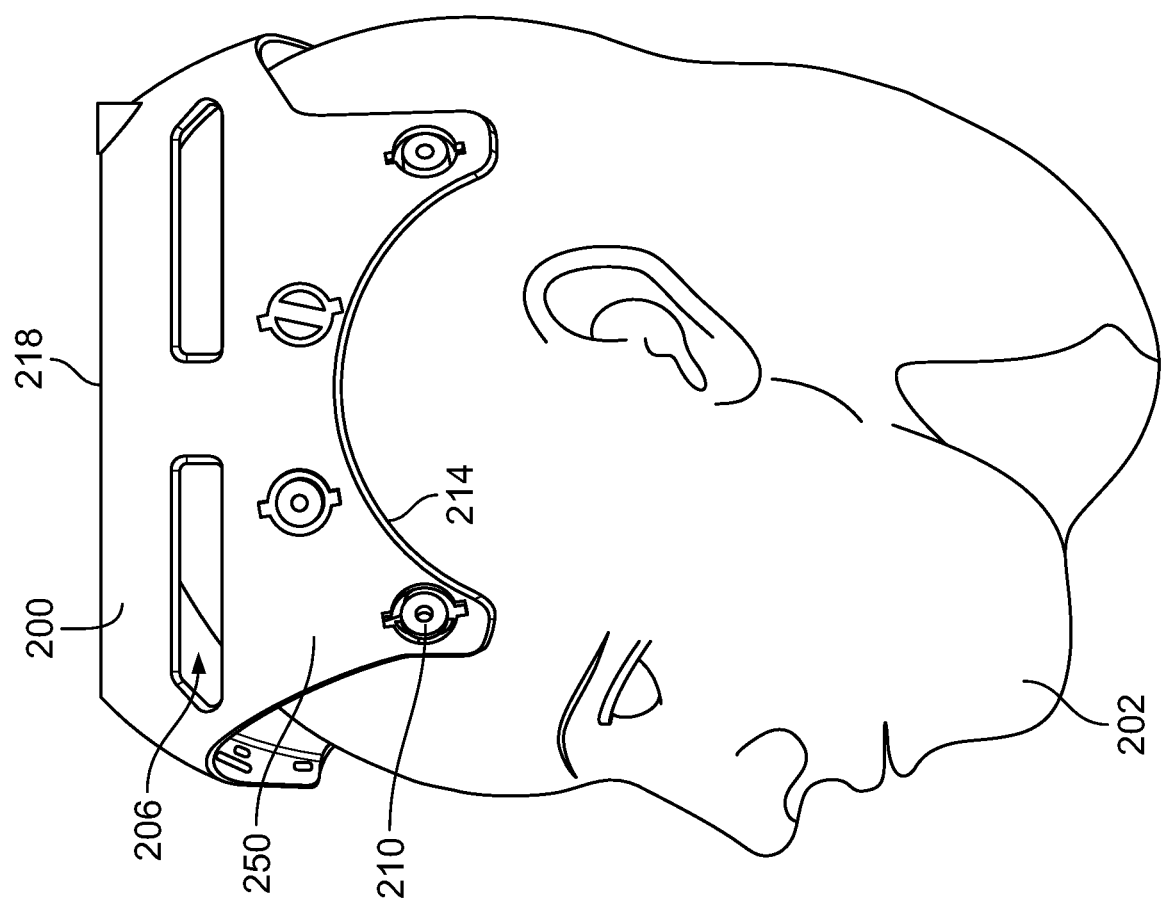
Figure 2C:
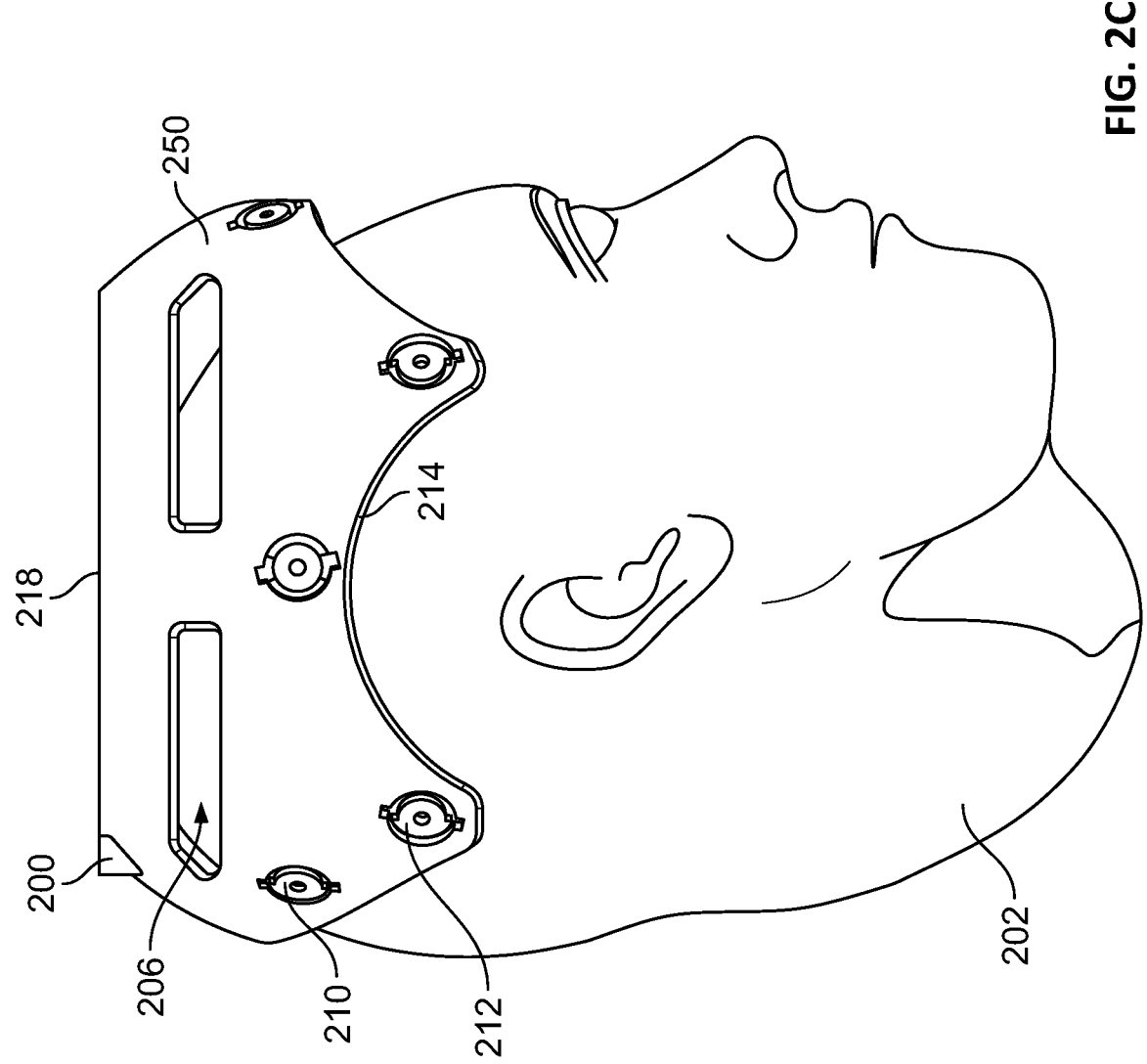
Figure 2D:
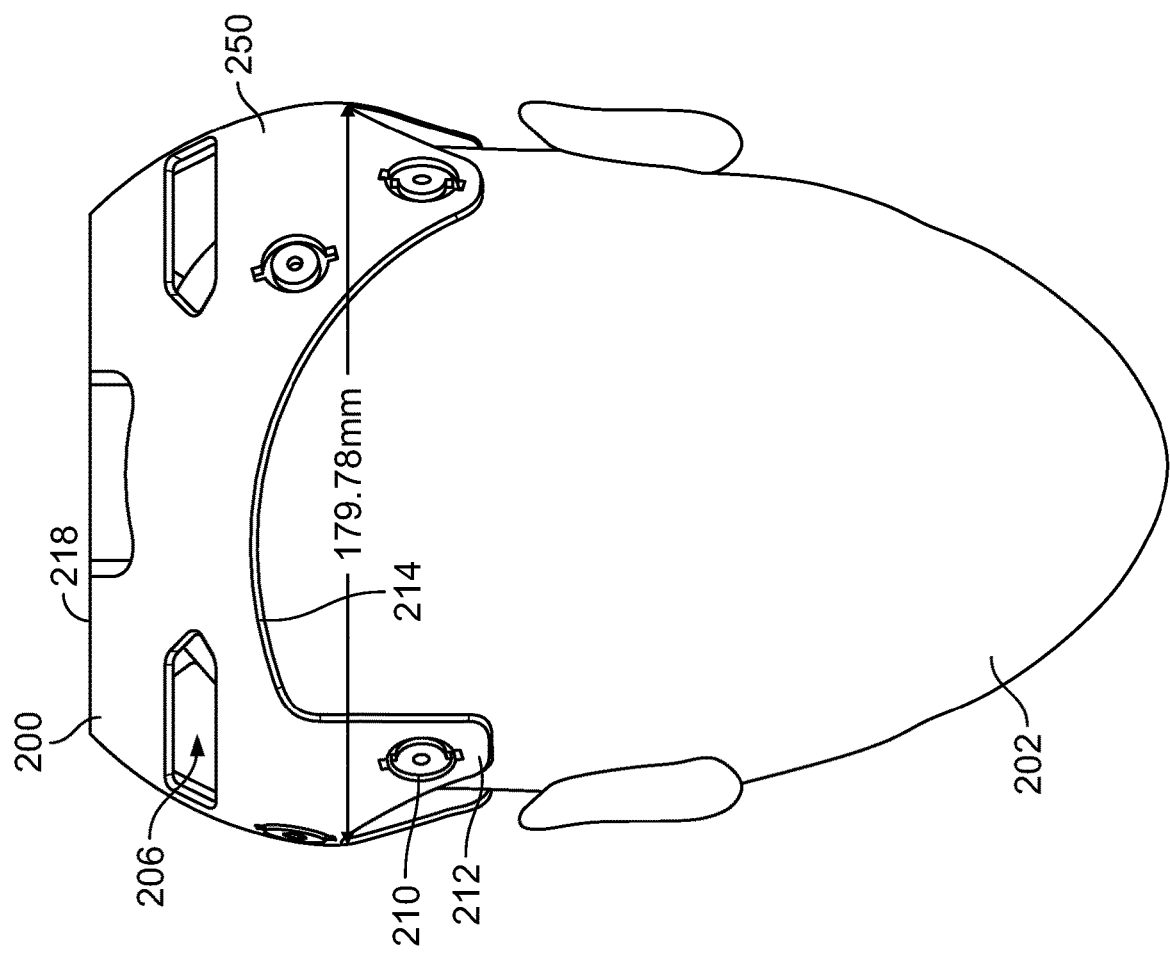
Figure 2E:
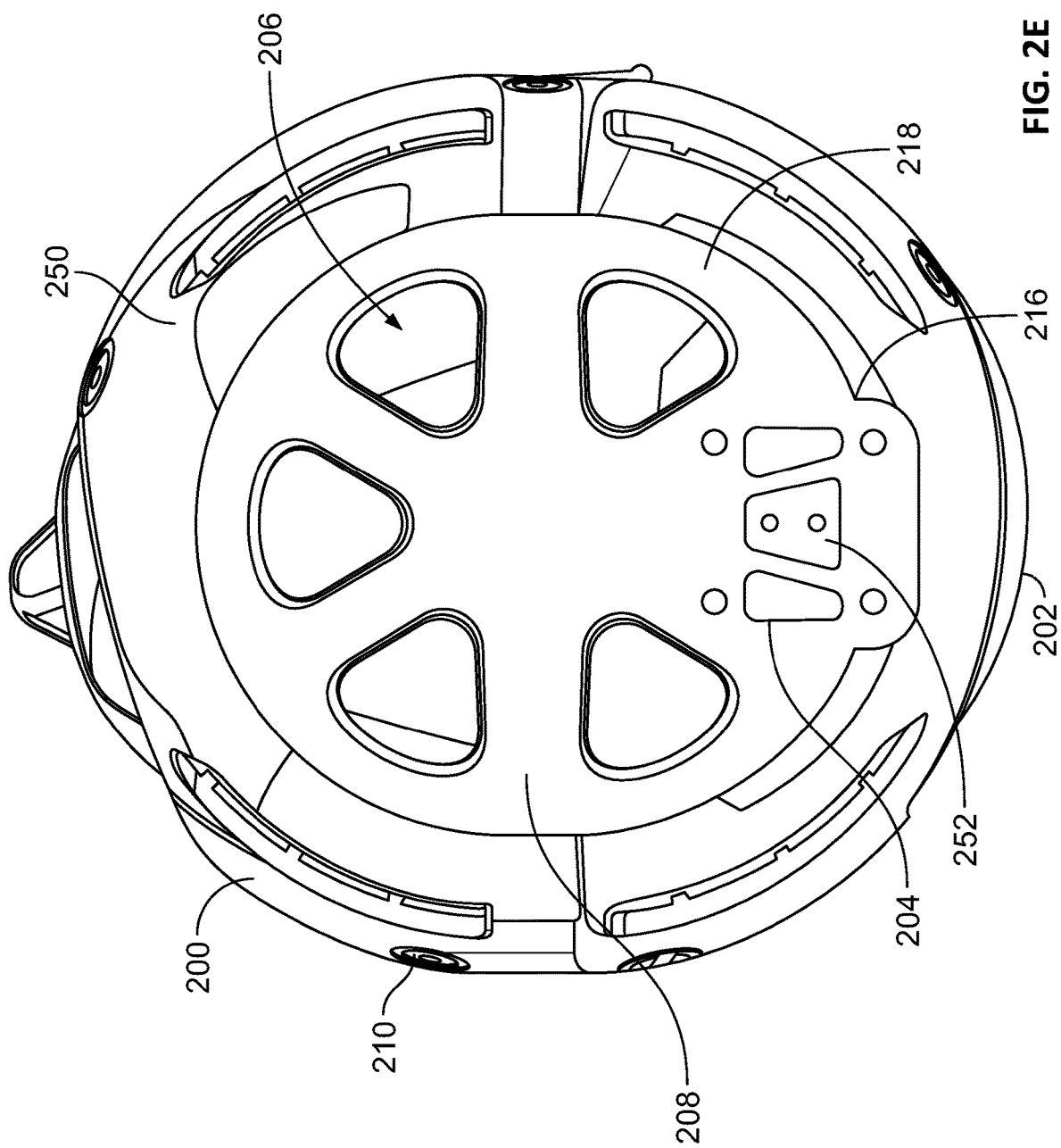
Figure 2F:
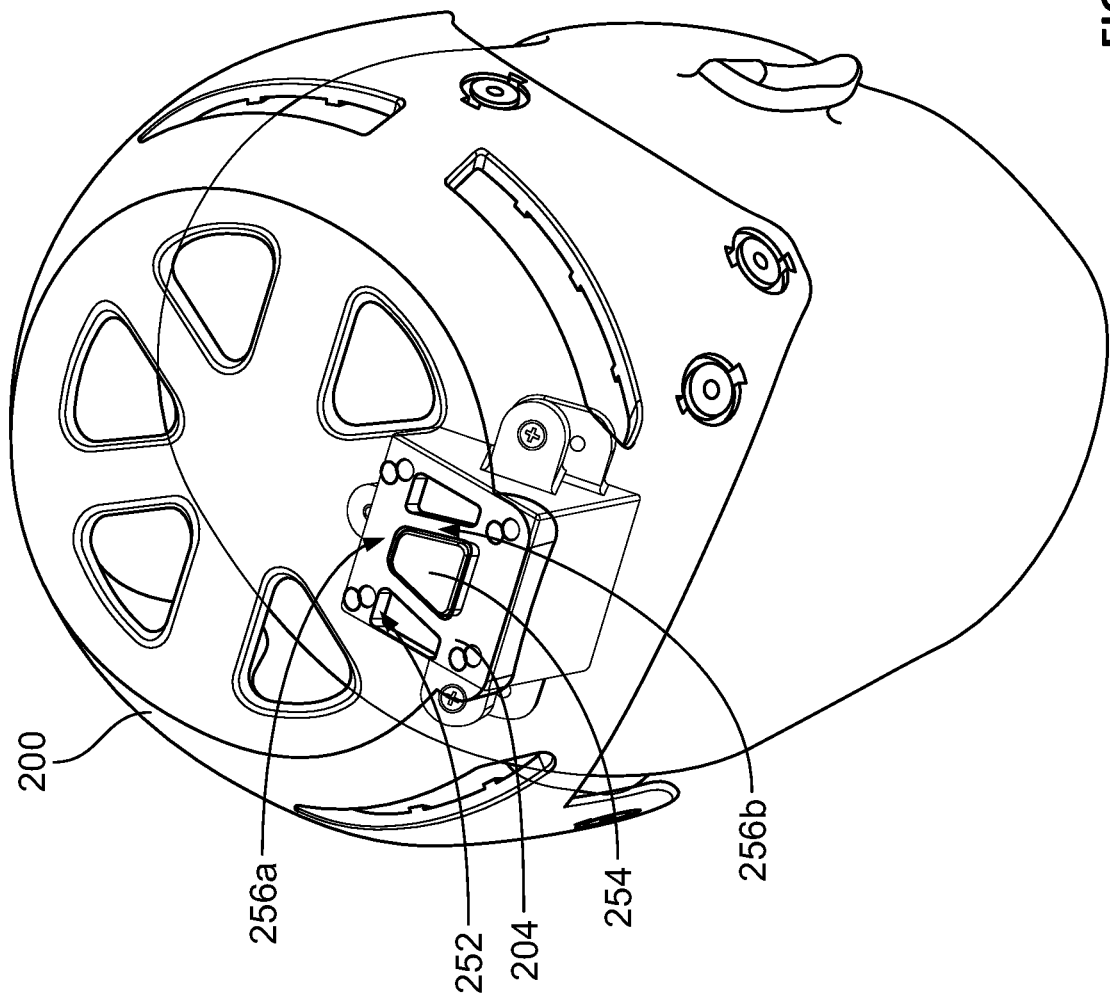
Figure 2H:
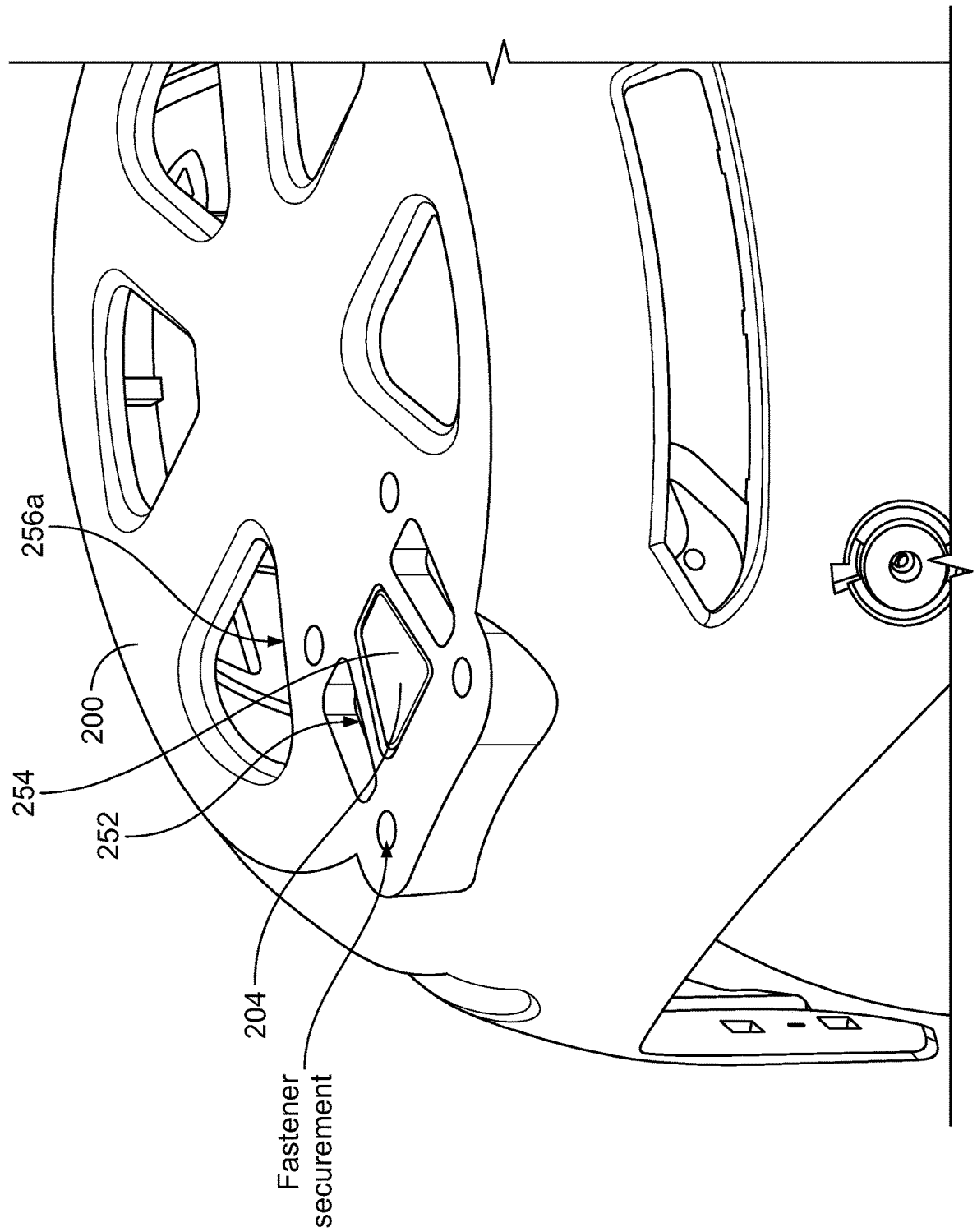
Figure 2I:
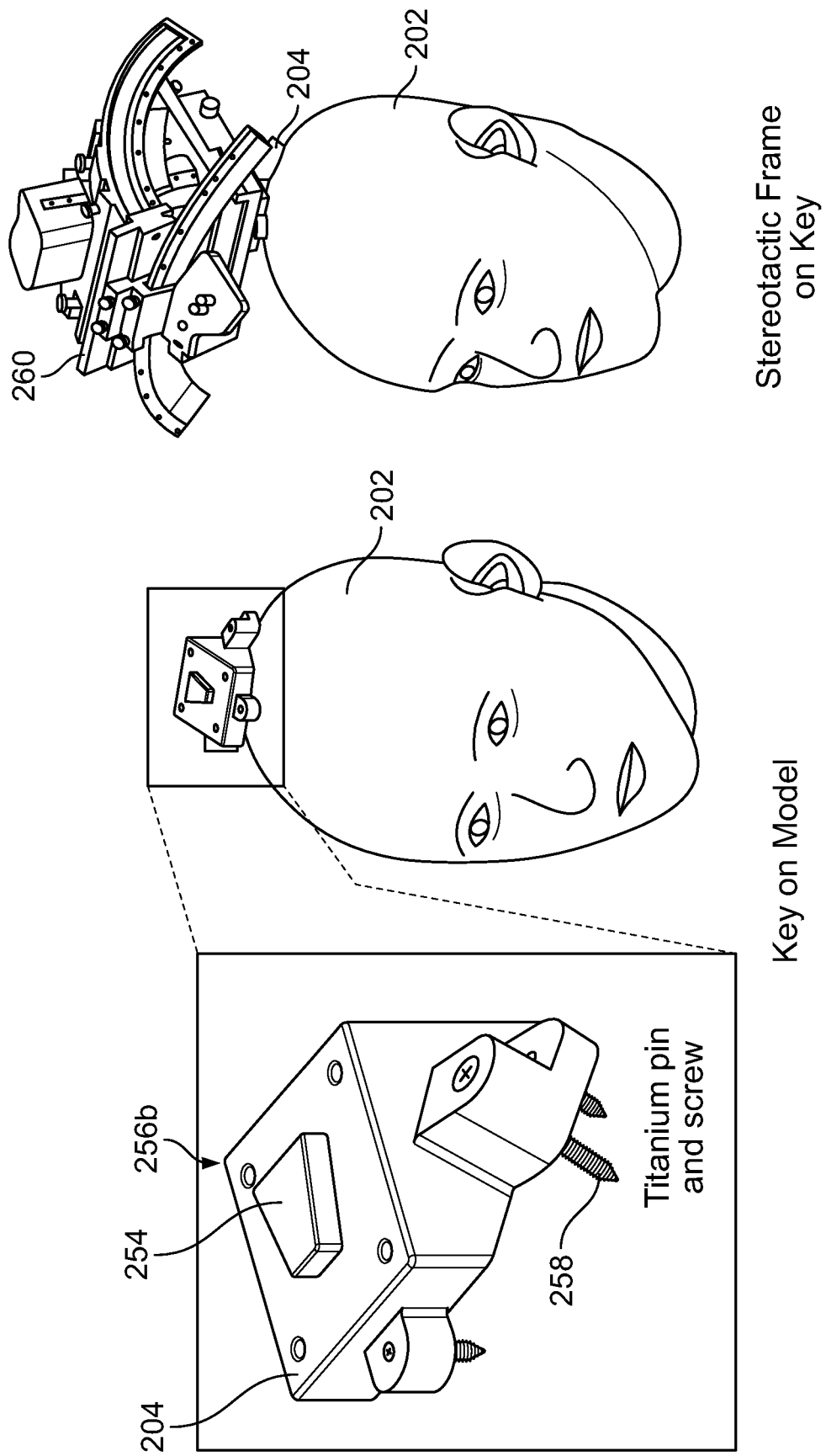
FIG. 2I is a diagram of an example key device, an example coupling between the key device to the head of a subject, and an example coupling between the key device and a stereotactic device.

As described above, in some implementations, the localizer apparatus 200 can be secured to a subject by first securing the key device 204 to the bone of the subject 202 (e.g., along the top of the subject's skull). In turn, the localizer apparatus 200 can be secured to the key device 204, such that the localizer apparatus 200 is fixed relative to the subject 202. The coupling between the localizer apparatus 200 and the key device 204 is shown in greater detail in FIGS. 2F-2H (showing a rear perspective view, a side view, and another rear perspective view, respectively). In FIGS. 2F and 2G, the localizer apparatus 200 is depicted as a translucent object, such that the coupling between the localizer apparatus 200 and the key device 204 can be seen more readily. As shown in FIGS. 2F-2H, the localizer apparatus 200 can include a mounting structure 252 (e.g., a socket) configured to mechanically coupled to at least a portion of the key device 204 (e.g., a corresponding protuberance 254 keyed to the socket).

Further, as shown in FIGS. 2F-2H, the localizer apparatus 200 and the key device 204 can have corresponding holes 256a and 256b, such that when the localizer apparatus 200 and the key device 204 are aligned to one another, each of the holes 256a is aligned with a corresponding one of the holes 256b. The localizer apparatus 200 and the key device 204 can be secured together by inserting one or more fasteners (e.g., a pin, bolt, screw, etc.) into the holes 256a and 256b.

The key device 204 is shown in greater detail in FIG. 21. As shown in FIG. 21, the key device 204 can include one or more pins and/or screws 258 that can be inserted into the head the subject 202 (e.g., the skull), such that the key device 204 is fixed to the subject 202. Further, a stereotactic device 260 can be mounted to the key device 204 (e.g., using a mounting bracket, pins, screws, sockets, and/or other mounting mechanisms), such that the stereotactic device 260 is also fixed to the subject 202. In some implementations, the stereotactic device 260 can including a similar mounting mechanism as the localizer apparatus 200. For example, the stereotactic device 260 can also include a mounting structure 252 (e.g., a socket) configured to mechanically coupled to at least a portion of the key device 204 (e.g., a corresponding protuberance 254 keyed to the socket). Further, the stereotactic device 260 can also include holes 256a that align with the holes 256b of the key device 204, such that the stereotactic device 260 and the key device 204 can be secured together by inserting one or more fasteners (e.g., a pin, bolt, screw, etc.) into the holes 256a and 256b.

Example Experimental Data

Example experimental studies were conducted to develop localizer apparatuses and to test the performance of those localizer apparatuses. These example studies demonstrate the feasibility of using ultra-high field 7T MRI imaging for neurosurgical navigation. The example techniques describe herein uses low-distortion high resolution imaging sequences and an example localizer apparatus to facilitate superior neuroanatomic parcellation and image registration. The enhanced visualization of distinct target structures may not only lead to improved surgical targeting and efficacy, but may also allow enhanced study of anatomic variations in neurologic disease.

Further details regarding these experimental studies are described below.

Overview

In some implementations, the planning of electrode placement for deep brain stimulation (DBS) may be limited by the MR image quality that is achievable by some MRI systems (e.g., 1.5T and 3T MRI systems), which may necessitate the use of indirect target guidance procedures such as use of a brain atlas. In addition, in some implementations, deep brain nuclei such as the subthalamic nucleus (the primary target for Parkinson's disease), may not be visualized MRI systems at 1.5T and 3T, which may require additional confirmation (e.g., electrophysiological recording). Imaging at 7T offers significantly improved image spatial and contrast resolution, particularly for visualizing these DBS targets.

In this study, a system was developed that permits 7T image registration and enables direct visualization of neural targets that might otherwise by unattainable at lower magnetic field strengths. In particular, 1) T1-weighted, T2-weighted, and T2*-weighted imaging sequence parameters were developed to optimize visualization of neural targets and fiducials, while also minimizing image distortion, 2) a skull-contoured localizer apparatus was developed with spherical point fiducials to enable image registration, 3) custom-built stereotactic software with functionality for point-based image registration, target selection, and trajectory guidance was developed to facilitate surgical intervention, and 4) high-angular resolution diffusion imaging (HARDI) for tractography were investigated to aid in target selection.

As a proof of concept, the 7T imaging of the basal ganglia nuclei was optimized to minimize image geometric distortion and maximize the target image contrast and signal-to-noise ratio (SNR). By mapping the spatial distortions in three-dimensions around the head, a skull-fixed localizer apparatus using point fiducials was developed and used to perform MR image volume registration. Target registration errors of <1 mm were achieved in phantom images. In addition, high angular resolution diffusion-weighted imaging were investigated to explore the ability of 7T to visualize white matter tracts for improved target selection. Finally, surgical software was developed that enabled image registration, targeting, and trajectory guidance. The system was successfully demonstrated in phantom studies and in vivo for surgical neuro-navigation, permitting future exploration for clinical implementation.

Example Methods

Figure 10:
FIG. 10 is a diagram showing SNR and CNR measurements in a representative T2* example. Panel A: green segmentations reflect the region used for calculating the mean signal intensity and the yellow segment represents the area used for calculating the mean background signal to calculate SNR. Panel B: the red (globus pallidus externus) and blue (internal capsule) segmentations represents the area used to calculate the CNR.
Figure 10:
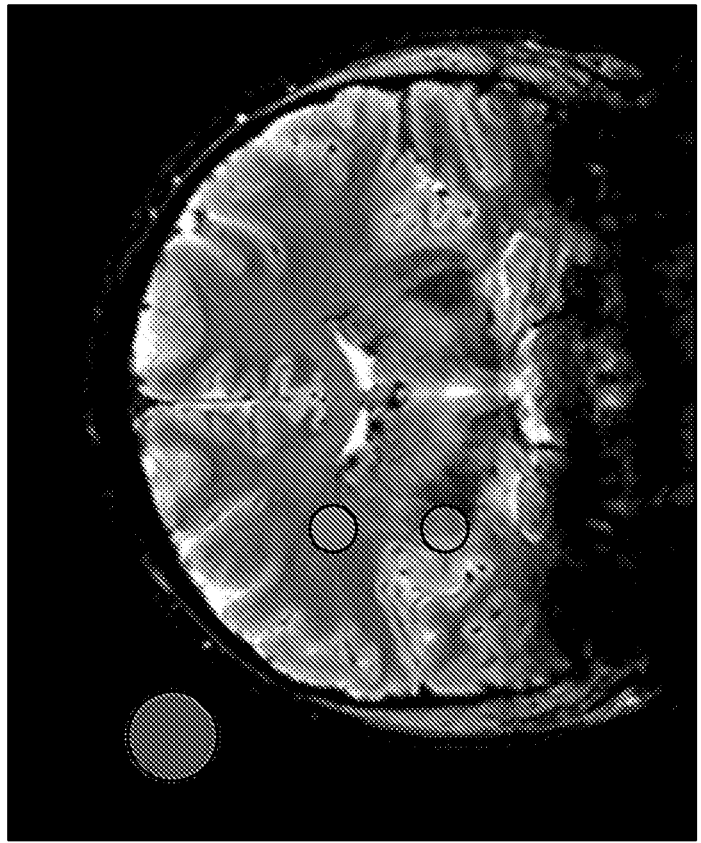

Imaging:

Imaging was performed at 7T (Magnetom Terra, Siemens Medical Systems, Germany) using a 1Tx/32Rx channel head coil (Nova Medical, Wilmington, Mass.). MPRAGE, FGATIR, T2-weighted, and T2*-weighted imaging sequences were adapted and optimized from 3T imaging protocols. The effect of increasing the receiver bandwidth on the geometric distortion was investigated, commensurate with maintaining adequate SNR. Image quality improvements were scored qualitatively by board-certified radiologists with >20 years of experience, using criteria including overall image quality, signal level, presence of artifacts, tissue contrast, and basal ganglia nuclei demarcation. An additional criteria of fiducial visualization was also assessed. Quantified measures of SNR, CNR, and image geometric distortion were also used to assess image quality improvements. SNR was calculated with correction for the Rayleigh distribution of background noise according to the following equation:

$$SNR_{stdev} = \frac{m_T}{\sigma_{Air}\sqrt{\frac{2}{4-\pi}}}$$

where $m_T$ is the mean signal from two distinct anatomic areas (putamen, subcortical white matter, FIG. 10, panel A) including ~60 mm³ area of tissue, and $\sigma_{Air}$ is the standard deviation of the background signal in a 60 mm³ area of air. CNR was calculated as:

$$CNR = \frac{|m_T - m_{AT}|}{m_T + m_{AT}}$$

where $m_T$ is the mean signal of the segmented globus pallidus externus nuclei and $m_{AT}$ is the mean signal in an equal sized area adjacent to the target (internal capsule) with no discernable nuclei (FIG. 10, panel B). The globus pallidus externus was chosen as it had noticeable variability in visibility between sequences.

Figure 11:
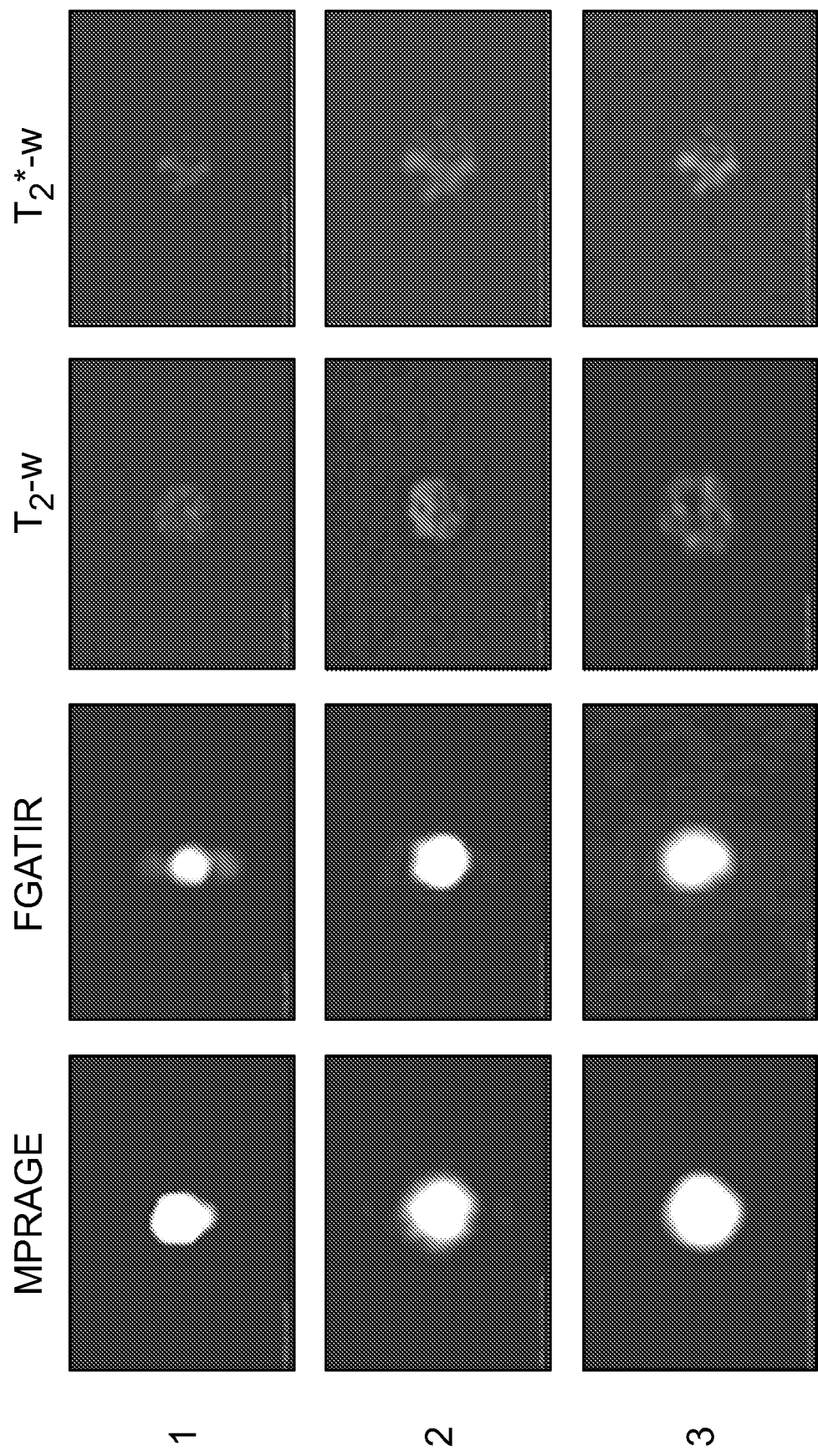
FIG. 11 is a diagram showing representative fiducial visualizations in each sequence for 3 subjects.

Distortion Analysis:

Extracranial distortion was analyzed via a custom distortion analysis device that fit around the subject's head within the 7T RF head coil. This device was designed using computer-aided design software (Onshape, PTC, USA) and 3D printed (S5, Ultimaker, Netherlands) using tough polylactic acid (PLA) plastic. Custom-made 4 mm spherical fiducials were developed for testing. Spherical point fiducials were chosen as they provide considerable flexibility in placement. In addition, regardless of image acquisition orientation, spherical fiducials result in a circle on each image slice enabling easy centroid assignment. These fiducials were devised with a silicone-based material visible with T1-, T2 and T2* weighted imaging (FIG. 11). They were found to maintain signal integrity over months of use without special care. These fiducials were built into the device and distributed around the head to provide "ground truth" positions for subsequent distortion analyses. They were spaced approximately 2 cm apart and evenly spaced to surround all portions of the head, except the occipital protuberance to allow the head to rest on the table. The fiducials were designed to produce point-like signal in the images acquired using each sequence. After imaging was performed, image volumes were loaded into the analysis software (3D Slicer v4, www.slicer.org26) and the centroid of each fiducial was manually selected. The software fit the fiducials' center points using rigid registration (least squares solution) to a model with fiducials in their geometrically correct position. This fitting assumed an isotropic zero-mean (unbiased) Gaussian noise. The registered coordinates of each fiducial were individually compared to their ground truth coordinates and the vector error taken as the local field distortion. Distortion tests were conducted on a head-shaped phantom filled with MR-visible oil (Marcol 82, ExxonMobil, USA) and on humans. Human testing was conducted in accordance with the local institutional review board. 9 healthy subjects (3 males and 6 females, ages 22-59) were tested.

Diffusion-Weighted Imaging and Tractography:

High angular resolution diffusion-weighted imaging (HARDI) was performed with 64 diffusion-encoding gradient directions acquired anterior to posterior and posterior to anterior (b=1000 s/mm2, voxel size: 1.5 mm isotropic, TR: 5900 ms TE: 61 ms, matrix:1600×1600, in-plane GRAPPA factor: 3, BW: 2604 Hz/px, partial Fourier factor: 6/8). 94 slices covering the whole brain was achieved using a simultaneous multi-slice factor of 2

The HARDI data was analyzed using FSL (https://fsl.fmrib.ox.ac.uk/fsl/fslwiki) 27 with the following analysis pipeline:
1) Conversion of DICOM to NIFTI format using dcm2niix
2) Topup—correct for susceptibility-induced distortion
3) BET—brain extraction tool 4) Eddy—correct for eddy current-induced distortion
5) Bedpostx—estimate the connectivity distribution of white matter pathways
6) FLIRT—Rigid registration (6 DOF) to an anatomic 3D MPRAGE T1-weighted image acquired in the same session (BET applied)
7) Tractography with seeding of bilateral masks of the red nucleus (dentate-rubro-thalamo-cortico tract) and midbrain cerebral peduncle (lateral corticospinal tract)
    a. Probabilistic tractography using FDT Probtracx in FSL. The settings were 5000 number of samples, a curvature threshold of 0.2, a maximum number of steps of 2000, and a step length of 0.5 mm.
    b. Deterministic tractography using the second-order Runge-Kutta integration method (3D Slicer Diffusion Module). Fractional anisotropy was used for thresholding. The settings were a seeding threshold of 0.3, a stopping threshold of 0.25, an integration step length of 0.5 mm, and a stopping track curvature of 0.8.

Segmentation:

All segmentations were performed manually using 3D Slicer v4. Segmentations for display of tractography was conducted on coronally acquired 2D T2*-w images (Table 1, T2*-w-Optimized) to visualize the thalamus, caudate, putamen, globus pallidus externus, globus pallidus internus, subthalamic nucleus, substantia nigra, and red nucleus by trained examiners. The clear visibility of the structure's borders enabled segmentation with high fidelity. A conservative approach to segmentation was followed whereby only voxels that had consensus between individual assessors were used. The segmentation volume was registered to the diffusion volume using an affine registration.

Figure 12C:
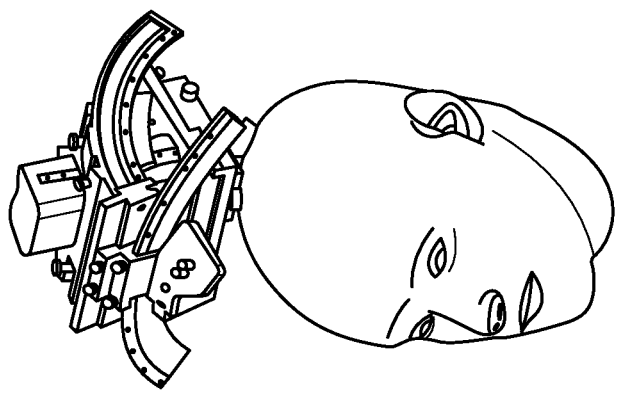
FIG. 12 is a diagram of an example D1 stereotactic system. Panel A: skull-secured device platform "Key." Panel B: 7T prototype image localizer. Panel C: targeting and delivery device for neurosurgical intervention.
Figure 12B:
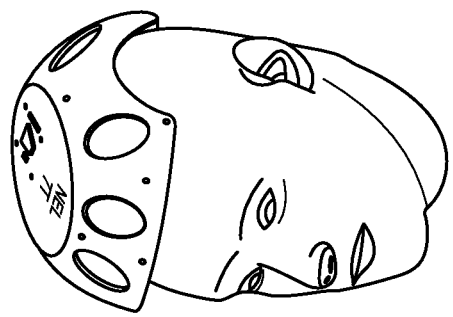
Figure 12A:
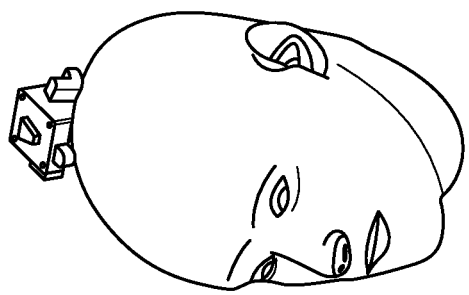

Prototype Localizer Design:

In stereotaxy, in some implementations, an image localizer (e.g., a localizer apparatus) can be needed to transform an MRI image volume into stereotactic coordinate space for surgical guidance. Due to the contoured nature of the NOVA RF head coil, a prototype localizer apparatus was designed using computer-aided design software (Onshape, PTC, USA) with the maximum dimensions that allowed accommodation of the localizer and a human head. The localizer was built to couple to a stereotactic targeting system undergoing clinical trial in the laboratory to allow future translation of this technology (FIG. 12). This system utilizes a small skull-secured device platform that permits rigid attachment of the image localizer to the skull. To permit rigid registration of the image volume 8 point fiducials were placed in a defined geometric pattern to allow for proper right/left, anterior/posterior, and superior/inferior image registration.

Phantom Testing:

Two phantoms were custom-designed and filled with oil (Marcol 82, ExxonMobil, USA) for MRI visibility and RF coil loading, with targetable fiducial points. The first phantom was custom-molded in the form of a head using acrylic and used in distortion testing. The second phantom was 3D-printed using tough PLA plastic on Ultimaker S5 3D printers and included of a mounting platform for the localizer and a basin containing oil with targetable points of known geometric coordinates. This localizer was used for assessment of fiducial registration error (FRE) and target registration error (TRE) with different imaging sequences. FRE is defined as the root mean square error of the fiducial points after rigid registration and is a measure of registration accuracy. TRE is defined as the 3D Euclidian distance between the geometrically correct target point and the target point selected in image space after rigid registration, and is an important measure for accurate surgical guidance. For these experiments, fiducial and target points were selected by two reviewers and the FRE and TRE values averaged.

New Localizer Design:

Initially, point fiducials were placed in a geometrically defined pattern using previously defined principles and without incorporation of distortion data in the placement decisions. After analysis of geometric distortion, the prototype localizer was re-designed to alter fiducial locations and reduce the effects of distortion on registration. Localizers were printed using tough PLA plastic as described earlier. After analysis of distortion data, the localizer design was modified with placement of fiducials in areas exhibiting least distortion. Placement of fiducials in these low distortion areas were intended to reduce fiducial localizer error (FLE) during fiducial centroid assignment, which has been shown to be correlated with target registration error. In addition, FRE was expected to decrease as a function of improved relative spatial orientation.

Stereotactic Software:

Custom-built fully functional stereotactic software was developed in the Python programming language. This software permitted visualization of DICOM images in the axial, coronal and sagittal planes. It abstracted DICOM header information for geometric positioning and permitted manual selection of fiducials, registration of images to stereotactic coordinate space with a rigid registration algorithm (least squared solution using singular value decomposition), target selection, and trajectory guidance. In addition, it had functionality to assess fiducial localization error, fiducial registration error (FRE), and target registration error (TRE). As FRE is uncorrelated with TRE, a poor FRE RMSE was considered >2 mm and the registration button was coded to glow red if this occurs, prompting the user to re-check fiducial localization. The control panel had a targeting frame with target readout and manual controllers of the arc (X-Z plane) and collar (Y-Z plane) angles. In addition, a registration panel enabled individual selection of fiducials for registration.

A number of libraries were used, which included: Tkinter for building the graphic user interface; Pydicom to read, write, and modify DICOM images; Python Imaging Library for image processing; Numpy for array and matrix mathematics; and Math for common math functions.

Figure 13C:
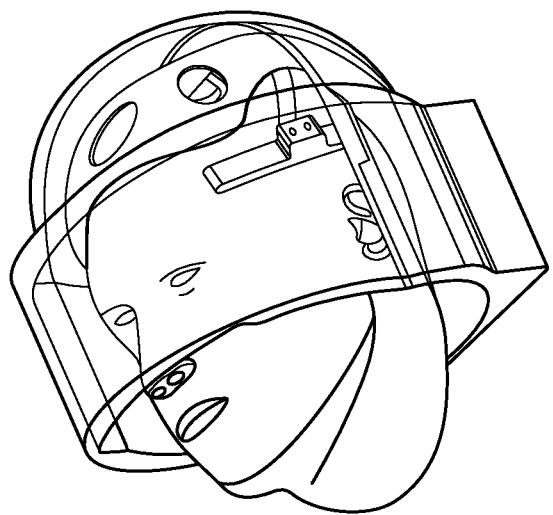
FIG. 13 is a diagram showing an example use of the image localizer. Panel A: localizer securement apparatus. Panel B: apparatus with localizer secured. Panel C: model of head positioning in the RF head coil with the localizer attached.
Figure 13B:
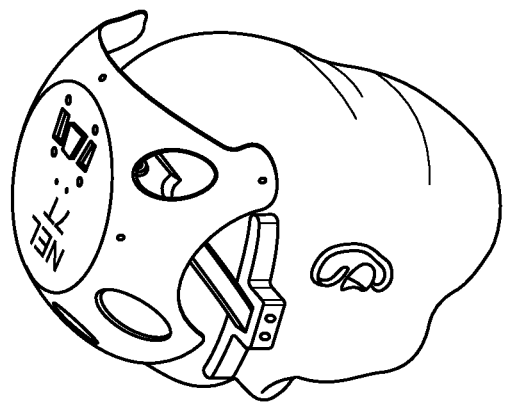
Figure 13A:
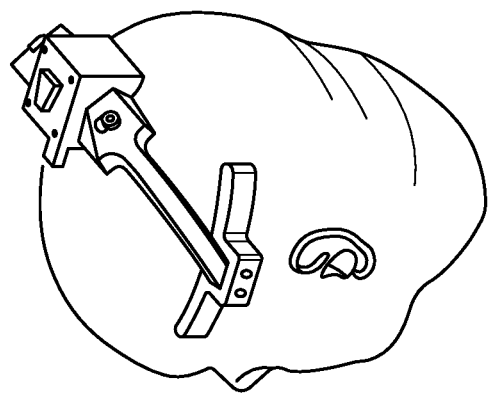

It was sought to test the localizer and surgical software on human subjects. To do so, a non-invasive securement apparatus was built that clamped laterally to a subject's head and comprised a localizer attachment point (FIG. 13). The localizer was secured and subjects were imaged with FGATIR and MPRAGE sequences developed in this study.

Statistical Analysis:

For distortion evaluation, comparisons between 2 groups were made using the Wilcoxon signed-rank test. Comparison between multiple groups was performed using the Friedman test with Dunn's corrected multiple comparison test. Equality of distribution between subjects was performed with the Kolmogorov-Smirnov test. Comparison between the apex, mid, and base was made using the Kruskal-Wallis test with Dunn's corrected multiple comparison test. Fiducial registration error and target registration error comparisons between localizers were made using the Mann-Whitney test. Comparisons between high and low bandwidths were made using the Friedman test. Data is represented as mean±standard error of the mean (SEM). Significance was set as a p value of <0.05.

Example Results

Quantitative Evaluation of Extracranial Distortion:

To determine the extracranial distortion among imaging sequences with varying weighting properties, a distortion analysis grid was developed and positioned around the head in the MRI scanner (FIG. 4, panel A). The root mean square error (RMSE) of local distortions was determined for each sequence at low and high bandwidths (BW) (FIG. 4, panel B). A two-way ANOVA was performed and found a significant interaction between the distortion effects of BW and sequence (F(3,24)=9.611, p=0.0002). Simple main effects analysis showed low BW acquisitions exhibited significantly higher geometric distortion compared to high bandwidth acquisitions (Bonferroni's test, MPRAGE and FGATIR p<0.0001, T2 and T2* p<0.01). In addition, sequence effects analysis showed that MPRAGE and FGATIR images exhibited larger distortion compared to T2 and T2* images at both BWs (p<0.0001). T2* had significantly lower distortion than T2 at both BWs (p<0.0001) and FGATIR had significantly lower distortion than MPRAGE only at low BW.

Local distortion derived from each fiducial revealed spatially significant differences, with significantly lower distortion measured in the mid-section of the distortion grid, which included most of the anatomic volume, compared to the apex and base (FIG. 4, panel C). T2 images have less spatial differences across the volume imaged, although fiducial visualization in the apex region was poor, especially at high bandwidth, leading to a significant number being omitted. The lowest distortion overall was found for T2* images, with significantly lower distortion measured in the mid region compared to the base at high BW, and compared to the apex at low BW (p<0.05). These findings were consistent in repeat experiments across two subjects (Table 2).

Figure 14:
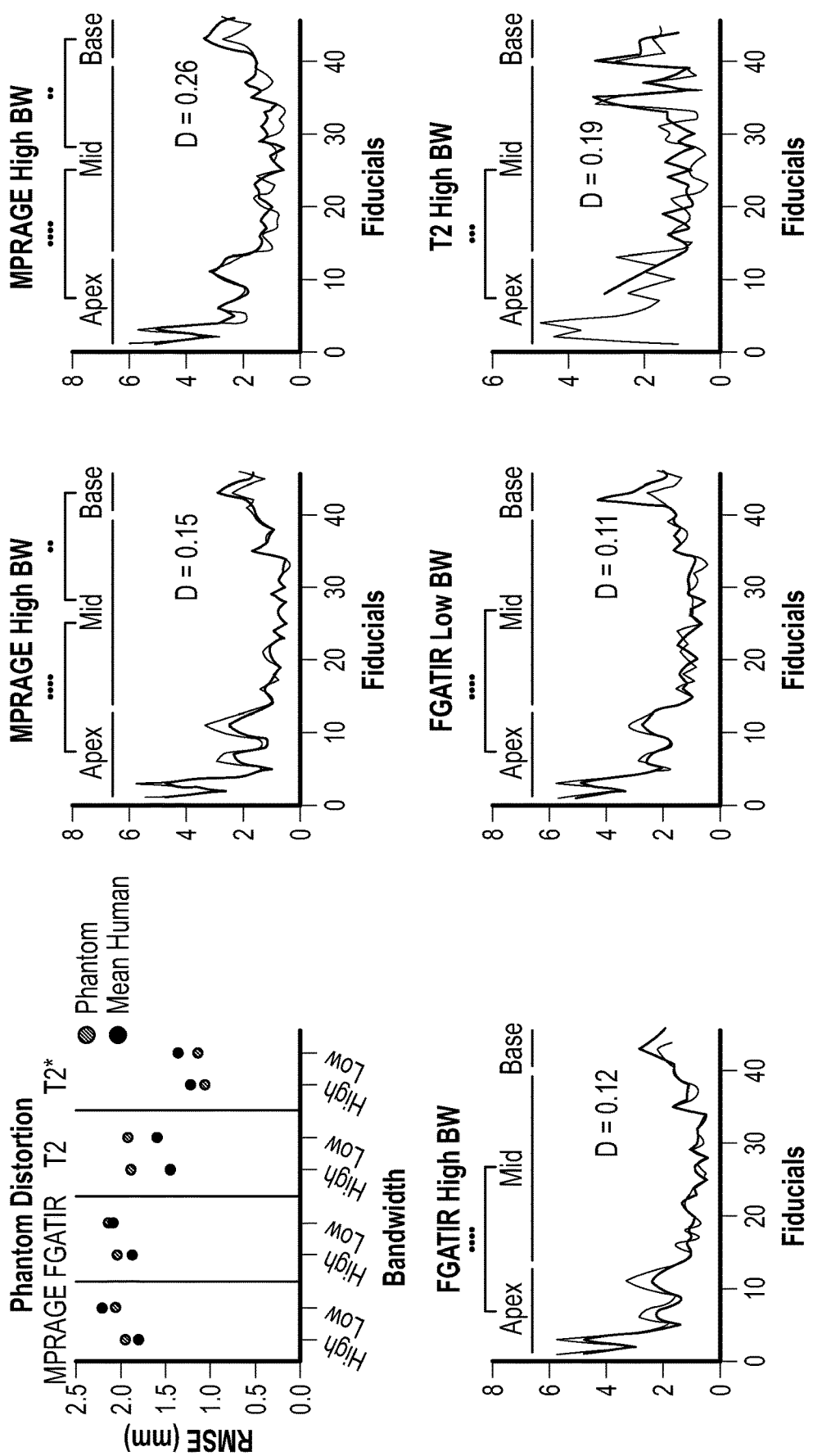
FIG. 14 is a diagram showing example phantom vs human distortion. The root mean square error (RMSE) of the phantom distortion (n=1/sequence) is displayed against the mean distortion from human testing. Each sequence is subsequently analyzed between phantom and mean human data. The Kolmogorov-Smirnov D statistic for distribution comparisons (D) is displayed in each figure. Phantom distortion was compared between three regions, the apex, mid, and base. *$p<.05$, $p<0.01$, *$p<0.001$, ****$p<0.0001$.
Figure 14:
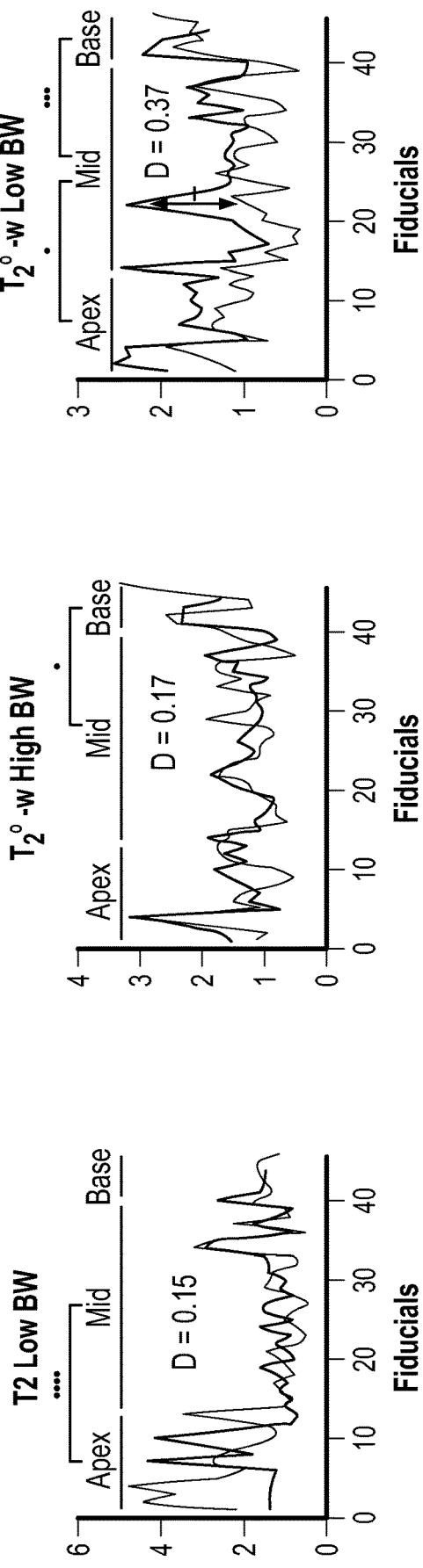

Distortion testing was subsequently performed on a human-head shaped phantom to understand the contribution of gross head morphology to the spatial pattern of distortion. (FIG. 14). Phantom testing demonstrated reduced differences in distortion effects from sequence and bandwidth (Mixed-effects model, F(3,7)=9.4), where only MPRAGE exhibited difference in distortion due to bandwidth (Bonferroni's test, p=0.0003) and T2* exhibited reduced distortion at both bandwidths (p<0.01). Despite this reduction, phantom data when compared to human (subject type) data using a mixed-effects model (restricted maximum likelihood) found no significant difference between subject types for the interaction of bandwidth and sequence (F(3,31)=0.26, p=0.85). In addition, the effect of subject type alone on distortion was non-significant (F(1,11)=2.98, p=0.11). These results suggest that the main determinants of distortion are sequence type and bandwidth, and do not significantly differ as subject type is varied.

Figure 5:
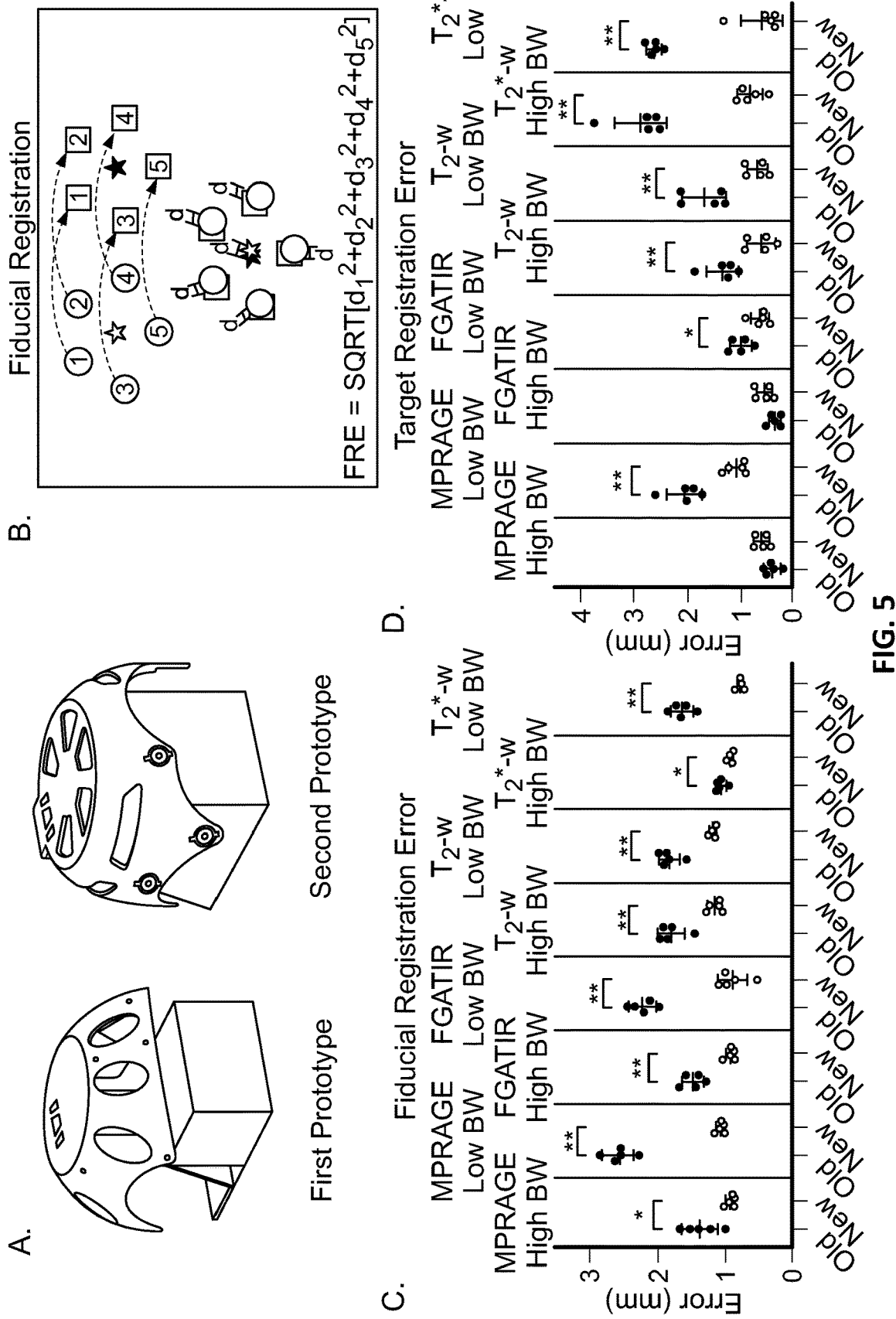
FIG. 5 is a diagram showing prototype localizer testing on a targetable phantom. Panel A: a prototype skull-contoured localizer using spherical point fiducials was tested for fiducial registration error (FRE) and target registration error (TRE) on a phantom containing points of known Euclidian values. The design was modified to optimize fiducial placement based on distortion data. Panel B a schematic demonstrating how point-based registration is achieved. Circles represent fiducials selected in imaging space, and squares fiducial positions in the stereotactic coordinate space of the surgical system. The stars indicate the surgical target location. Panels C and D: Target registration error (TRE). Fiducial registration Error (FRE). Dashed lines represent rigid transformation of fiducial clouds used in image registration. The FRE and TRE among different sequences at low (L) and high (H) receiver bandwidths was determined.

Examination of Localizer Registration:

FIG. 5. compares results obtained for two prototypes of the head localizer. The two designs are shown in FIG. 5, panel A, with the second shape designed to incorporate fiducials in spatial areas which exhibited low geometric distortion across the imaging sequences evaluated. The schematic in FIG. 5, panel B illustrates how point-based image registration is accomplished and how FRE and TRE are determined. FIG. 5, panels C and D show FRE and TRE for both localizers at high and low bandwidths.

FRE, the error of fiducial registration, was found to be significantly reduced for all sequences with the new design, at low and high BWs. (three-way RM ANOVA, $F_{interaction}$ (3,24)=35.45, $p_{interaction}$<0.0001). A two-way repeated measures (RM) ANOVA was performed for FRE values from the first phantom and the second phantom separately to examine the effects of bandwidth and sequence type. For the first phantom, there was a significant interaction between the effects of sequence and bandwidth on FRE (F(3,24)=34.95, p<0.0001). Simple main effects analysis showed that the higher bandwidth increased FRE for MPRAGE (p<0.0001), FGATIR (p<0.0001), and T2* (p<0.0001) imaging. Test using the second localizer found significant interaction between sequence and bandwidth (F(3,24)=3.93, $p_{seq}$*BW=0.21), however, there was no significant difference in FRE between bandwidths (F(1,8)=0.003, p=0.96). Additionally, FRE had reduced variance across sequences (F test, p<0.0001). These findings demonstrated the second localizer design robustly improved image registration across sequences and bandwidth.

TRE, a determinant of the inherent error of target selection due to imaging and image registration, was also found to be reduced with the second design (FIG. 5, panel D). TRE was reduced in all sequences at low-bandwidth (Mann-Whitney test, MPRAGE p<0.05, all others p<0.01) and was reduced for high bandwidth T2 and T2* sequences (Mann-Whitney test, p<0.01). A two-way RM ANOVA was performed for TRE values from the first phantom and the second phantom separately to examine the effects of bandwidth and sequence type. For the first phantom, there was a significant interaction between the effects of sequence and bandwidth on FRE (F(3,24)=16.76, p<0.0001). Simple main effects analysis showed that higher bandwidth increased FRE for MPRAGE (p=0.0003) and FGATIR (p=0.0023) imaging. However using the second localizer, while significant interaction was found between sequence and bandwidth (F(3,24)=3.93, p=0.21), there was no significant difference in FRE between bandwidths (F(1,8)=0.003, p=0.25). Additionally, TRE remained consistent across sequences using the second localizer, and had reduced variance compared to the old design (F test, p<0.0001). These findings demonstrated that the second localizer significantly improved the accuracy and reduced the variability of target selection across sequences.

Figure 6:
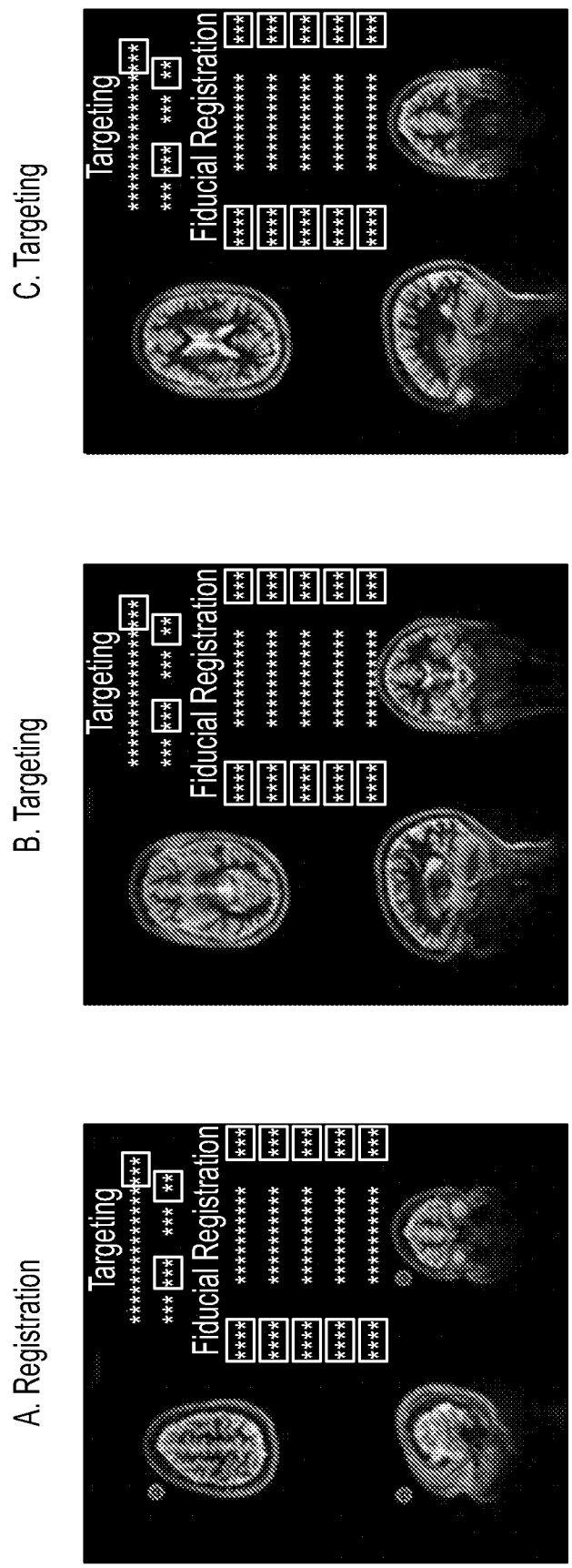
FIG. 6 is a diagram showing custom stereotactic neuronavigation software. Custom stereotactic software was written in python to permit use of a point-based fiducial image localizer device. A subject was fitted with the device loosely placed on the top of the head. A 3D MPRAGE image acquired sagittally is displayed with image reconstruction in the axial and coronal planes. Panel A: this software permitted manual selection of fiducials (yellow circle) and rigid fiducial registration. In addition, software allowed targeting of neural structures (red point with green outline circle on GPi) (Panel B) and trajectory guidance (blue dot) (Panel C). All views allow independent scrolling. The target and manually adjustable collar and arc angles are available in the targeting box.

Human Testing of Localizer and Software:

This software was designed to permit image registration using a point-based localizer. Manual fiducial selection was performed using the fiducial registration panel for the 8 localizer fiducials. Rigid registration was achieved using the coded least squares solution (FIG. 6, panel A). The RMSE of the rigid registration is displayed in the software to inform the user if registration was successful or not. Using the localizer, the study achieved sub-2 mm RMSE for FGATIR and MPRAGE sequences. Upon successful registration, visualization and targeting was performed through independent scrolling in axial, coronal, and sagittal views with coordinate readout in the software control panel (FIG. 6, panel b, upper right corner. Trajectory angle manipulation available in the X-Z plane (arc) and the Y-Z plane (collar) allowed creation of an optimal path to target avoiding eloquent structures and vasculature. The created trajectory was visible as a marker with a customizable elliptical safety margin (FIG. 6, panel C).

Figure 7:
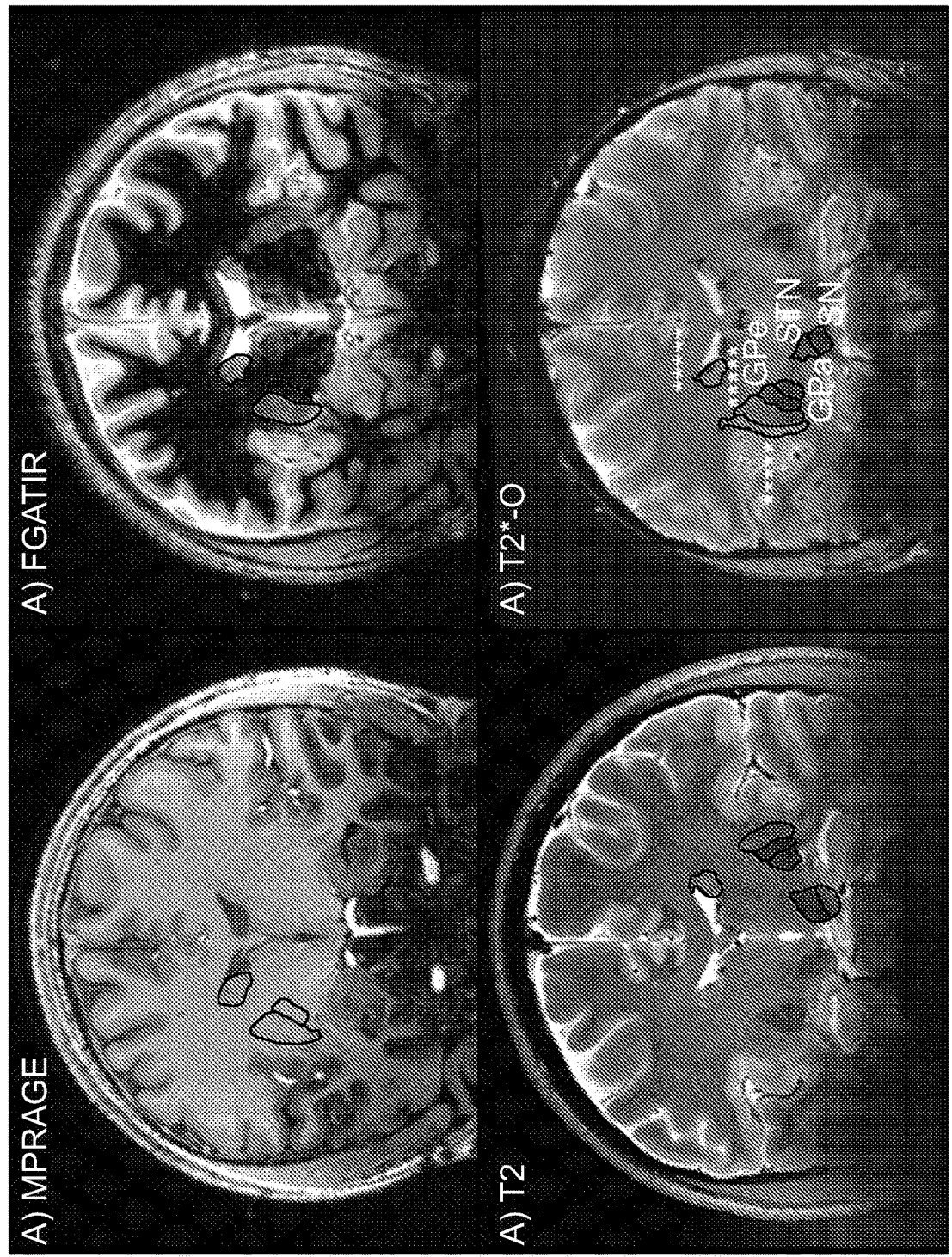
FIG. 7 is a diagram showing a representative example of basal ganglia visualization with multiple weighting schemes. Panel A: a 3D T1-w MPRAGE (low) image permits clear visualization of the caudate (yellow) and putamen (light blue) with mild visualization of the globus pallidus externus (GPe, green). Panel B: 3D T1-w FGATIR (low) image permits similar visualization. Panel c: a 2D coronal T2-w (low) image permits clear visualization of the caudate, putamen, moderate visualization of the globus pallidus externus and internus (GPi, purple), and mild visualization of the subthalamic nucleus/substantia nigra complex (STN, SN, orange). Panel D: a 2D coronal T2*-w sequence permits clear visualization of the caudate, putamen, claustrum (blue) globus pallidus externus, globus pallidus internus, subthalamic nucleus, and substantia nigra.

Evaluation of In Vivo Image Quality:

The optimized 7T MR imaging sequences that were developed for visualization of basal ganglia nuclei to enhance neuro-navigation are presented in Table 1, with representative in vivo images presented in FIG. 7. The sequences achieved an optimal trade-off between the receiver bandwidth, SNR, and contrast and spatial resolution for the standard anatomical sequences to maximize visibility of target nuclei. A dual-echo acquisition was implemented for the T2*-weighted sequence to allow for optimal fiducial visualization (TE1=7.4 ms, due to the short T2* of the fiducial material) and target nuclei contrast (TE2=20 ms). The field of view for all sequences was larger than that typically used clinically, in order to encompass the stereotactic head frame. Nevertheless, all sequences were developed with a maximal scan time of ~10 min to remain clinically applicable.

Figures 15A, 15B:
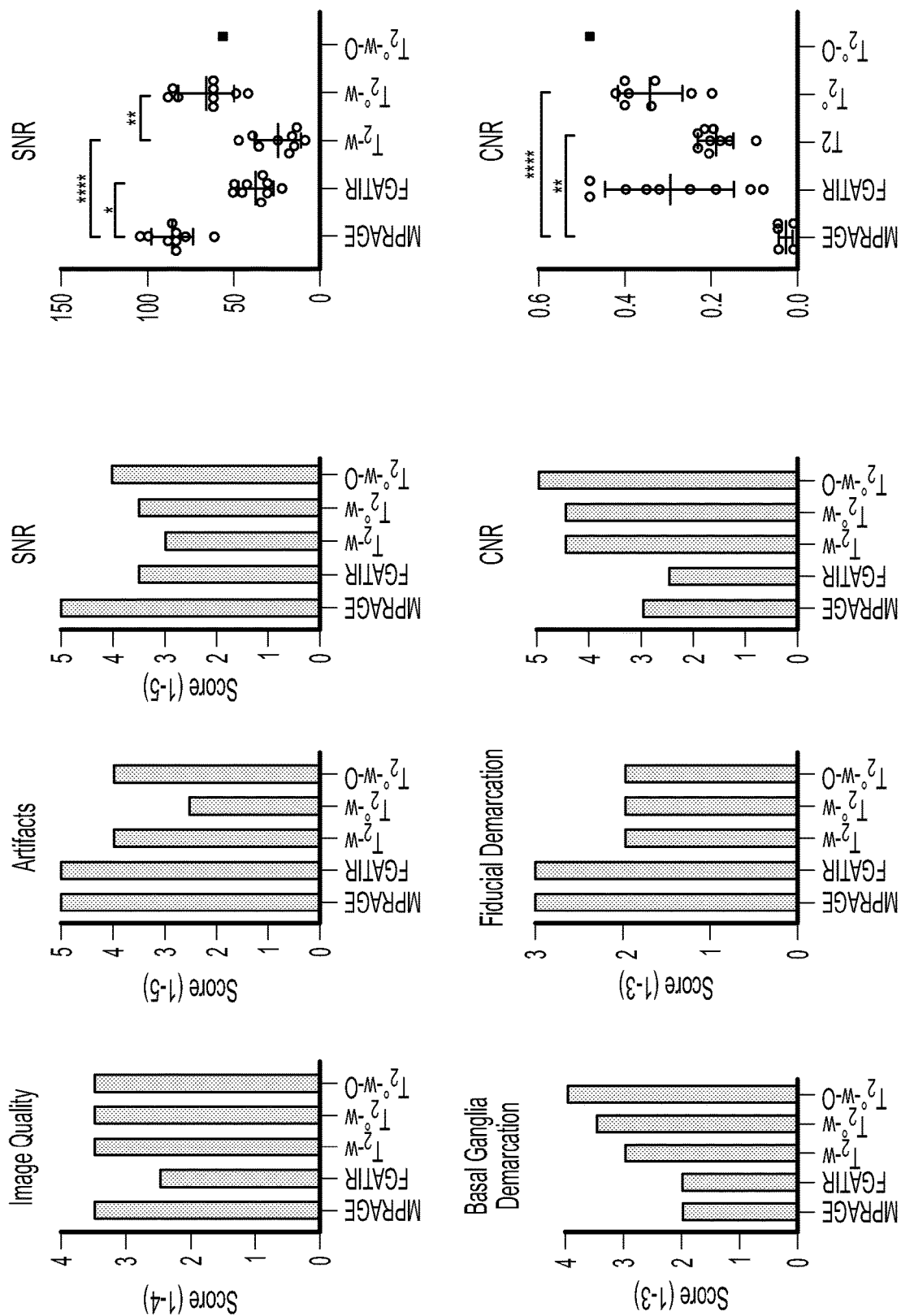
FIG. 15 is a diagram of an example image sequence evaluation. Panel A: 6 qualitative categories were evaluated for each image sequence. These include image quality, presence of artifacts, signal-to-noise ratio (SNR), contrast-to-noise ratio (CNR), basal ganglia demarcation, and fiducial demarcation. Panel B: SNR and CNR were qualitatively evaluated for each sequence. Sequences were compared using the Friedman's test with Dunn's multiple comparisons test. *$p<0.05$, $p<0.01$, **$p<0.0001$.

Evaluation of image sequences (FIGS. 7 and 15, panel A) revealed notable differences. Overall image quality was equal for MPRAGE, T2-weighted and T2*-w weighted images (3.5/4), while FGATIR scored lower at 2.5/4. MPRAGE and FGATIR images exhibited the least artifacts as scored 5/5. T2*-w weighted scored the lowest at 2.5/5, with noticeable artifacts in the basal ganglia and brain stem regions. MPRAGE images scored highest for SNR at 5/5, and quantified measure of SNR also found MPRAGE to be highest at 85.8±4.0, although statistical significance was not achieved against T2*-w weighted images at 66.6±5.3 (FIG. 15, panels A and B ±SEM). T2-w weighted and T2*-w images scored highest for CNR at 4.5/5, and T2*-w weighted images had the greatest quantified CNR at 0.34±0.07 although statistical significance was not achieved against FGATIR (0.30±0.05) and T2-w weighted images (0.19±0.01; T2-w vs. T2*-w, $p_{adj}$=0.17; FGATIR vs. T2*-w, $p_{adj}$>0.99). It was noted that FGATIR experienced significant variation in CNR across the brain (range: 0.08-0.48; coefficient of variation=50%), due to variation in the efficiency of the inversion pulses in areas of high B0 and B1 inhomogeneity. Basal ganglia demarcation was best in T2*-weighted images, recorded as 4/4 (FIG. 15), permitting visualization of the caudate, putamen, claustrum, globus pallidus externus (GPe), globus pallidus internus (GPi), the substantia nigra (SN), and the subthalamic nucleus (STN). There was considerable variability in nuclei visibility for FGATIR images between subjects, particularly in the globus pallidus nuclei (FIG. 15). Fiducial visualization was greatest in MPRAGE and FGATIR images at 3/3, although fiducials could be clearly visualized in all sequences (FIG. 11).

Figure 8:
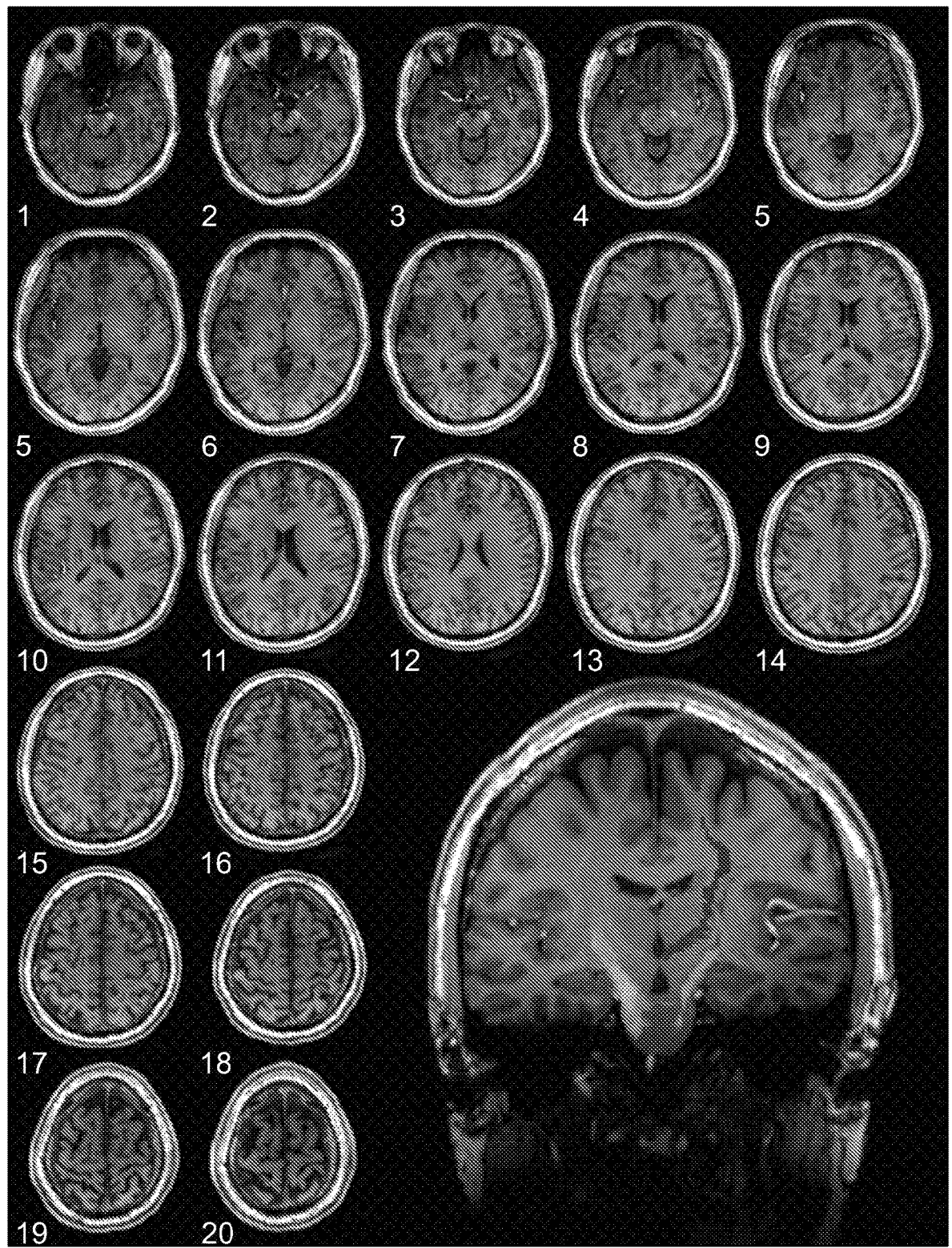
FIG. 8 is a diagram showing probabilistic tractography of the lateral corticospinal (LCS) tracts (yellow and blue) and dentato-rubro-thalamo-cortical (DRT) tracts (green and red) overlaid onto an anatomic T1-w MPRAGE volume. Images 1-20 show the course of the tracts from the midbrain to the cortex. The LCS tract climbs lateral to the DRT in the basal ganglia through the posterior portion of the internal capsule. The DRT tract climbs medial to the LCS through the ventromedial portion of the thalamus.
Figure 9:
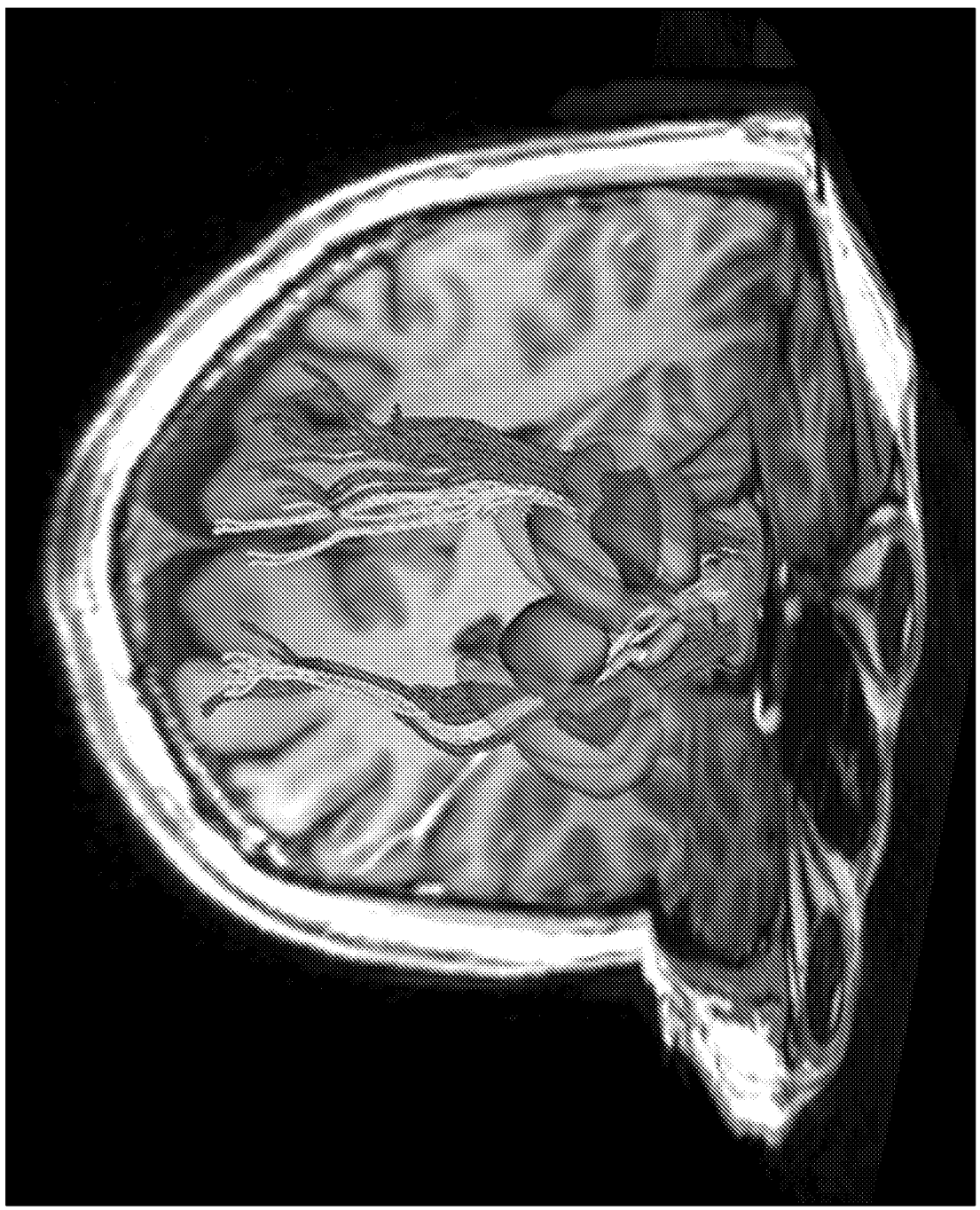
FIG. 9 is a diagram showing example 3D visualization of tractography. High angular resolution diffusion weighted imaging (HARDI) with 64 directions was performed. Deterministic tractography was implemented (second-order Runge-Kutta integration method, 3D Slicer Diffusion module) to visualize white matter tracts. The red nucleus was seeded to visualize the dentato-rubro-thalamo-cortical tract (green), and the anterior horns of the midbrain seeded to visualize the lateral cortical spinal tracts (red) Manual segmentation of the caudate (maroon), putamen (orange), GPe (blue), GPi (green), thalamus (grey), STN (yellow), SN (purple), and red nucleus (red) was performed and overlaid.

Segmentation and DTI:

HARDI with probabilistic tractography revealed the dentato-rubro-thalamo-cortical tract and its course through the thalamus, enabling localization of the ventral intermediate nucleus (VIM), which could not be revealed with imaging alone (FIG. 8). Seeding of the middle cerebral peduncle also revealed the lateral corticospinal tract (LCST) and its path through the posterior portion of the internal capsule to the motor cortex as a demonstration to visualize the proximity of a known passing fiber track at risk of off-target stimulation affects (FIGS. 8 and 9).

DISCUSSION

These studies explored the use of 7T MIll imaging for DBS surgical guidance. In the past, efforts have been made to use 7T imaging for DBS surgery through image fusion with CT or lower-field MRI scanners. However, none have directly used 7T imaging for neuro-navigation nor have been translated from research trials. This has been due to a number of logistic and technical factors, including lack of access to clinical 7T scanners, inexperience with image fusion techniques, and absence of compatible stereotactic systems. A point-based localizer was developed that enabled direct registration of 7T imaging. Complementary imaging sequences were developed that address elevated geometric distortion at ultra-high field strength to reduce targeting errors. These enabled accurate and reliable targeting in tailored-made stereotactic software. The low target registration errors achieved in this study lay the groundwork for clinical translation.

Findings from this study demonstrate the challenge of mitigating distortion for effective image registration at ultra-high field strength. Prior work has focused on intracranial distortion effects at 7T; however, comprehensive extracranial distortion studies are lacking and are of great importance when developing image localizers for stereotactic systems. The study conducted a detailed mapping of extracranial distortion across a number of clinical sequences and parametrizations. The study demonstrated that extracranial distortion effects varied with sequence, with distortion decreasing at higher sequence bandwidths. The study also observed geometric variations in distortion, with the base of the skull and areas above the apex of the head subject to the greatest distortion. This is likely due to increased B0 inhomogeneity occurring primarily adjacent to areas with significant magnetic susceptibility differences such as air/tissue interfaces. In addition, distortion has been shown to increase with distance from the isocenter. Analysis of extracranial distortion enabled establishment of guidelines for fiducial placement on the finalized localizer design in locations that demonstrated the least amount of distortion. This enabled successful reduction in registration error across varying image sequences to sub-1 mm levels, compatible with clinical translation. Reduction in fiducial localization error (FLE) due to decreased local distortion likely led this finding, as FLE directly correlates with TRE. In addition to the application of extracranial distortion mapping to localizer design, the data generated here are generalizable to other applications including placement of skin fiducials for radiosurgery or new imaging sequence performance considerations.

7T markedly enhances image clarity and enables distinct nuclei to be resolved. Different pulse sequences have unique advantages and disadvantages when being used for DBS. The study found that T1-weighted sequences (MPRAGE and FGATIR) offered the greatest fiducial visualization and signal uniformity. This finding is likely due to the chemical properties of the fiducials, which have a longer relaxation time with T1-weighting (material composition not disclosed, patent pending). MPRAGE appeared to be superior to FGATIR for qualitative measures and afforded greater SNR. However, ins some implementations, these sequences may be inferior to T2 and T2* sequences for CNR and basal ganglia demarcation. T2* appeared to be promising for clinical translation, as it performed well in visualizing basal ganglia structures and had significantly lower geometric distortion. However, T2* imaging required a double echo time to both resolve fiducials (short relaxation time) and achieve optimal contrast for nuclei demarcation. In some implementations, this may present a challenge for stereotactic software. An additional advantage noted for T2* imaging was clarity of blood vessels, including microvessels of the basal ganglia. This offers considerable benefit for image-guided surgery as contrast may no longer be needed.

Future progress for this work will involve additional parameterization and sequence exploration. In this study, only four imaging modalities were explored and bandwidth effects analyzed, as these have previously been shown to affect distortion. The T1-w sequences had acquisition times as long as 10 minutes, which in some implementations, may be too burdensome for patients with movement disorders. Further developments in compressed sensing and parallel transmit technology may help to reduce these acquisition times. Finally, a larger study is warranted to confirm findings, examine safety and patient comfort, and generate protocols for clinical use.

Diffusion tensor imaging has typically been used for the study of structural connectivity in the brain. Its use in DBS targeting is emerging, and is based on the idea that DBS exerts its effects through modulation of action potentials, and direct targeting of fiber tracks improve clinical outcomes. Further, DTI can help resolve unseen and ambiguous target structures. DTI quality improves primarily with gradient slew rate and image resolution. Current 7T systems have the same gradient set (e.g., same amplitude and slew rates) as high-end 3.0T systems, but the improved SNR at 7T can be traded for increased spatial resolution. This extra spatial resolution is particularly beneficial for tractography. In some implementations, tractography may aid in the delineation of sensorimotor regions of the STN and GPi, respectively, with the potential to improve surgical targeting and thus patient outcomes. In this study, tractography enabled identification of the thalamic VIM, which not currently visible with MRI and the prime target for treatment of essential tremor. In addition, it was able to identify the LCST, a fiber track running proximal to the VIM and a common cause of stimulation-induced side effects due to inaccurate VIM targeting. This adds additional credence to the potential of DTI to improve target selection in DBS planning.

The major focus of this work was to investigate whether optimized imaging protocols and a point-based fiducial localizer could be used for direct targeting in 7T MRI. To this end, it was demonstrated that the ability to use 7T MRI for direct visualization of key neural structures. The imaging localizer and sequence parameterization allowed for accurate registration of 7T MRI images. Basal ganglia structures targeted in DBS could be clearly realized. Targeting was reproducibly performed with millimetric accuracy, on the level needed for clinical application. Finally, the use of DTI enhanced targeting capabilities and enabled validation of target placement.

Summary of Experimental Study:

In this study, it was demonstrated that the ability to use 7T MRI for direct targeting. Basal ganglia nuclei could be clearly defined for target selection. DTI enhanced targeting capabilities and served to aid target placement. The imaging localizer and sequence parameterization allowed for accurate registration of MRI images with minimized errors. Targeting could be reproducibly performed with millimetric accuracy, on the level needed for clinical application. Future studies may be performed in larger cohorts to confirm findings and develop protocols for clinical use.

Tables

TABLE 1

Example Imaging Parameters.

| Imaging Parameters | $T_2$ TSE | MPRAGE | FGATIR | SWI |
|---|---|---|---|---|
| Voxel size [mm$^3$] | 0.34 × 0.26 × 2 | 0.8 × 0.8 × 0.8 | 1.0 × 1.0 × 1.0 | 0.6 × 0.6 × 0.8 |
| TE [ms] (low/high BW) | 56 | 1.74 | 1.43/2.03 | 4.1 |
| TR [ms] | 5750 | 3000 | 6000 | 6.5 |
| TI [ms] | — | 1050 | 685 | — |
| Flip Angle | 150 | 9 | 6 | 15 |
| GRAPPA factor | 2 | 3 | 3 | 3 |
| BW$_r$ [Hz/pixel] (low/high BW) | 245/638 | 220/1410 | 420/1520 | 520/1340 |

$T_2$ TSE = $T_2$-weighted turbo spin echo; MPRAGE = magnetization prepared rapid gradient echo; FGATIR = fast grey matter acquisition T1 inversion recovery; SWI = susceptibility-weighted imaging; fMRI = functional MRI; TE = echo time; TR = repetition time FoV = field of view; TE = echo time; BW$_r$ = receiver bandwidth.

TABLE 2

Inter-subject distribution analysis.

| | MPRAGE-H | MPRAGE-L | FGATIR-H | FGATIR-L | T2-H | T2-L | $T_2$*-H | $T_2$*-L |
|---|---|---|---|---|---|---|---|---|
| p value | 0.95 | 0.95 | 0.93 | 0.48 | 0.41 | 0.85 | 0.46 | 0.24 |
| D | 0.11 | 0.11 | 0.12 | 0.18 | 0.25 | 0.16 | 0.19 | 0.24 |

Example Systems

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the computer system 104 and/or the MR scanner 102 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 16:
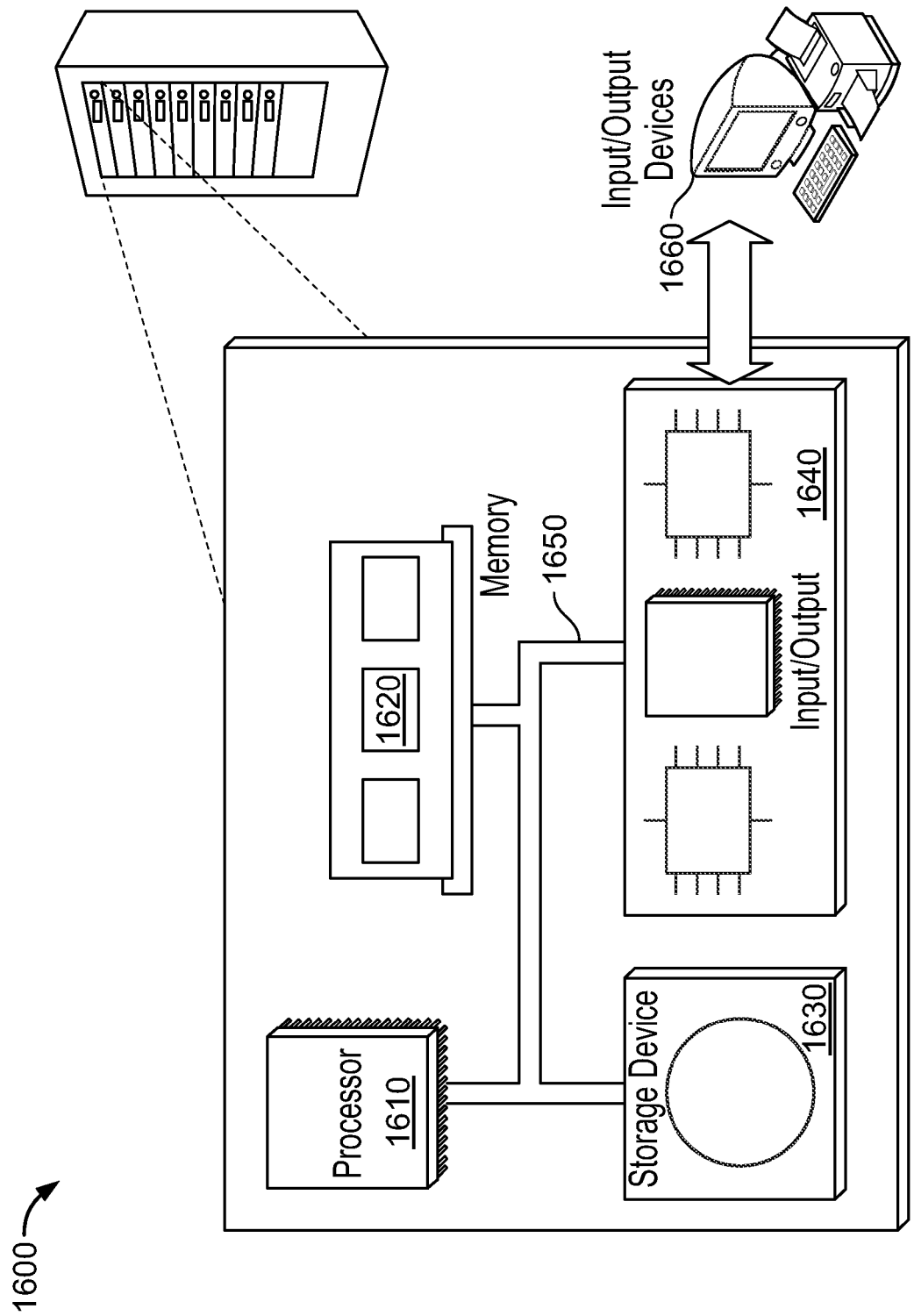
FIG. 16 is a diagram of an example computer system.

FIG. 16 shows an example computer system 1600 that includes a processor 1600, a memory 1620, a storage device 1630 and an input/output device 1640. Each of the components 1610, 1620, 1630 and 1640 can be interconnected, for example, by a system bus 1650. The processor 1610 is capable of processing instructions for execution within the system 1600. In some implementations, the processor 1610 is a single-threaded processor, a multi-threaded processor, or another type of processor. The processor 1610 is capable of processing instructions stored in the memory 1620 or on the storage device 1630. The memory 1620 and the storage device 1630 can store information within the system 1600.

The input/output device 1640 provides input/output operations for the system 1600. In some implementations, the input/output device 1640 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 1660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the following claims.

What is claimed is:

1. An apparatus, comprising:
a shell portion configured to be worn over a head of a subject, the shell portion defining a plurality of apertures;
a plurality of spherical fiducial structures disposed on the shell portion, wherein each of the fiducial structures comprises a first material doped with a second material, wherein the second material is a contrast agent for magnetic resonance imaging (MRI); and
a mounting structure disposed on the shell portion and configured to secure the shell portion to the head of the subject,
wherein the shell portion comprises a plurality of protuberances extending from a bottom edge of the shell portion and away from an upper surface of the shell portion,
wherein the shell portion comprises a plurality of sockets, each of the sockets configured to receive a respective one of the fiducial structures,
wherein at least one of the sockets is disposed on at least one of the protuberances.

2. The apparatus of claim 1, wherein the first material is silicon.

3. The apparatus of claim 1, wherein the second material is copper sulfate.

4. The apparatus of claim 1, wherein the shell portion comprises plastic.

5. The apparatus of claim 1, wherein the plastic is polylactic acid (PLA) plastic.

6. The apparatus of claim 1, wherein the shell portion comprises a glass-filled polymer.

7. The apparatus of claim 1, wherein at least some of the apertures are wedge shaped.

8. The apparatus of claim 1, wherein at least some of the apertures are aligned along a circumference of the shell portion.

9. The apparatus of claim 1, wherein the sockets are distributed on the shell portion according to a rotationally asymmetric pattern.

10. The apparatus of claim 1, wherein at least one of the sockets is disposed between two adjacent protuberances.

11. The apparatus of claim 1, wherein the apparatus comprises a plurality of caps, wherein each of the caps is configured to insert into a respective one of the sockets.

12. The apparatus of claim 11, wherein each of the sockets comprises one or more respective slots configured to receive a respective one of the caps.

13. The apparatus of claim 1, wherein the apparatus is configured to be worn over the head of the subject while the head of the subject is in a bore of a 7-Tesla MRI system.

14. The system apparatus of claim 1, wherein each of the plurality of apertures has a primary dimension of elongation that aligns with a circumference of the bottom edge of the shell portion in a latitudinal direction such that the plurality of apertures are each longer latitudinally than longitudinally on the shell portion.

15. A system comprising:
a magnetic resonance imaging (MRI) system comprising one or more computer systems, and
the apparatus of claim 1,
wherein the MRI system is configured to:
generate, while the apparatus is being worn by the subject, one or more images of the subject and the apparatus,
determine, based on the one or more images, a respective position of each of the fiducial structures relative to the subject, and
determine, based on the determined positions of each of the fiducial structures, a three-dimensional coordinate system fixed to the subject.

16. The system of claim 15, wherein the MRI system is further configured to:
identify, based on the one or more images, one or more anatomical features of the subject, and
determine, for each of the one or more anatomical features, a location of the anatomical feature according to the three-dimensional coordinate system.

17. The system of claim 15, further comprising a stereotactic device having one or more surgical instruments, wherein the stereotactic device is configured to be secured to the head of a subject.

18. The system of claim 17, wherein the one or more surgical comprise at least one of a probe, a cannula, or an electrode.

19. The system of claim 15, wherein determining the respective position of each of the fiducial structures relative to the subject comprises:
receiving, by the MRI system, user input identifying at least some of the fiducial structures in the one or more images.

20. The system of claim 15, wherein determining the respective position of each of the fiducial structures relative to the subject comprises:
automatically identifying, by the MRI system, at least some of the fiducial structures in the one or more images.

* * * * *